US011605019B2

(12) United States Patent
Aggarwal et al.

(10) Patent No.: US 11,605,019 B2
(45) Date of Patent: Mar. 14, 2023

(54) VISUALLY GUIDED MACHINE-LEARNING LANGUAGE MODEL

(71) Applicant: Adobe Inc., San Jose, CA (US)

(72) Inventors: Pranav Vineet Aggarwal, San Jose, CA (US); Zhe Lin, Fremont, CA (US); Baldo Antonio Faieta, San Francisco, CA (US); Saeid Motiian, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 853 days.

(21) Appl. No.: 16/426,298

(22) Filed: May 30, 2019

(65) Prior Publication Data

US 2020/0380403 A1 Dec. 3, 2020

(51) Int. Cl.
*G06K 9/00* (2022.01)
*G06N 20/00* (2019.01)
*G06K 9/62* (2022.01)
*G06N 3/08* (2023.01)
*G06F 16/538* (2019.01)
*G10L 15/22* (2006.01)
*G06F 40/30* (2020.01)

(52) U.S. Cl.
CPC ........... *G06N 20/00* (2019.01); *G06F 16/538* (2019.01); *G06K 9/6215* (2013.01); *G06K 9/6217* (2013.01); *G06N 3/08* (2013.01); *G06F 40/30* (2020.01); *G10L 15/22* (2013.01)

(58) Field of Classification Search
None
See application file for complete search history.

(56) References Cited

U.S. PATENT DOCUMENTS

| 8,928,813 | B2 | 1/2015 | Liu |
| 11,144,784 | B2 | 10/2021 | Aggarwal et al. |
| 2015/0347528 | A1 | 12/2015 | Jugel et al. |
| 2016/0328776 | A1 | 11/2016 | Amacker |
| 2017/0206465 | A1 | 7/2017 | Jin et al. |
| 2017/0330054 | A1 | 11/2017 | Fu et al. |

(Continued)

FOREIGN PATENT DOCUMENTS

WO WO-2020131140 A1 * 6/2020 ........... G06F 16/783

OTHER PUBLICATIONS

"Foreign Office Action", GB Application No. 2004709.8, dated Jul. 7, 2021, 3 pages.

(Continued)

*Primary Examiner* — Tuankhanh D Phan
(74) *Attorney, Agent, or Firm* — FIG. 1 Patents

(57) ABSTRACT

Visually guided machine-learning language model and embedding techniques are described that overcome the challenges of conventional techniques in a variety of ways. In one example, a model is trained to support a visually guided machine-learning embedding space that supports visual intuition as to "what" is represented by text. The visually guided language embedding space supported by the model, once trained, may then be used to support visual intuition as part of a variety of functionality. In one such example, the visually guided language embedding space as implemented by the model may be leveraged as part of a multi-modal differential search to support search of digital images and other digital content with real-time focus adaptation which overcomes the challenges of conventional techniques.

20 Claims, 18 Drawing Sheets

(56) References Cited

U.S. PATENT DOCUMENTS

| | | | |
|---|---|---|---|
| 2019/0188285 A1 | 6/2019 | Scheau et al. | |
| 2019/0325342 A1* | 10/2019 | Sikka | G06V 10/255 |
| 2019/0347357 A1 | 11/2019 | Murali | |
| 2021/0019342 A1* | 1/2021 | Peng | G06K 9/6215 |
| 2021/0365727 A1 | 11/2021 | Aggarwa et al. | |

OTHER PUBLICATIONS

"Notice of Allowance", U.S. Appl. No. 16/426,264, dated May 27, 2021, 7 pages.

"Pre-Interview First Office Action", U.S. Appl. No. 16/426,369, dated Jul. 21, 2021, 4 pages.

"Combined Search and Examination Report", GB Application No. 2004709.8, dated Sep. 10, 2020, 6 pages.

"First Action Interview Office Action", U.S. Appl. No. 16/426,264, dated Nov. 18, 2020, 21 pages.

"Pre-Interview First Office Action", U.S. Appl. No. 16/426,264, dated Oct. 2, 2020, 21 pages.

"Corrected Notice of Allowability", U.S. Appl. No. 16/426,264, dated Sep. 14, 2021, 2 pages.

"Examination Report No. 1", AU Application No. 2020202021, dated Oct. 21, 2021, 5 pages.

"Notice of Acceptance", AU Application No. 2020202021, dated Oct. 29, 2021, 4 pages.

"Restriction Requirement", U.S. Appl. No. 16/426,369, dated Nov. 12, 2021, 7 pages.

Lee, Kuang-Huei et al., "Stacked Cross Attention for Image-Text Matching", Proceedings of the European Conference on Computer Vision (ECCV) [retrieved Dec. 3, 2021], Retrieved from the Internet <https://openaccess.thecvf.com/content_ECCV_2018/papers/Kuang-Huei_Lee_Stacked_Cross_Attention_ECCV_2018_paper.pdf>, Oct. 6, 2018, 16 pages.

"Final Office Action", U.S. Appl. No. 16/426,264, dated Jan. 27, 2021, 21 pages.

"Foreign Office Action", GB Application No. 2004709.8, dated Dec. 3, 2021, 10 pages.

"Foreign Office Action", GB Application No. 2004709.8, dated Apr. 8, 2022, 8 pages.

"Non-Final Office Action", U.S. Appl. No. 16/426,369, dated Apr. 22, 2022, 9 pages.

U.S. Appl. No. 16/426,369, filed Oct. 18, 2022, "Notice of Allowance", U.S. Appl. No. 16/426,369, filed Oct. 18, 2022, 15 pages.

U.S. Appl. No. 17/398,317, filed Nov. 22, 2022, "Non-Final Office Action", U.S. Appl. No. 17/398,317, filed Nov. 22, 2022, 28 pages.

\* cited by examiner

VISUALLY GUIDED MACHINE-LEARNING LANGUAGE MODEL

BACKGROUND

Language models are used via machine learning to support a variety of functionality by service provider systems and other computing devices. Examples of this functionality include text classification (e.g., to assign tags or categories to text), natural language understanding (e.g., machine reading comprehension and natural language processing), digital content searches (e.g., to locate digital images or videos based on a text query), speech recognition, text summarization (e.g., to shorten long sequences of text using natural language processing), and so forth.

Conventional language models are trained as part of machine learning using text, alone. As such, conventional language models have limited visual intuition regarding visual concepts that are expressed by the text, e.g., for digital images that are associated with the text including captions and so forth. This lack of visual intuition may therefore cause text to be disposed in different clusters within an embedding space implemented by conventional language models even when that text describes similar visual concepts. Text describing a bicycle, for instance, may be disposed in a cluster within the embedding space that is quite different than a cluster used to describe a motorbike. This is due to an inability of a conventional language model to determine that the digital images associated with this text are visually similar, even though this text describing the concept may be quite different, textually.

Accordingly, service provider systems that rely on conventional language models to support visual concepts may encounter inaccuracies and fail in some instances for tasks such as text classification, natural language understanding, digital content searches, speech recognition, and text summarization. A service provider system that relies on conventional language models to perform a digital image search, for instance, may return a search result having a multitude of disparate digital images covering a wide range of objects, scenes, and other visual characteristics. This is because even though text associated with the digital images may be textually similar to a search query processed by the language model, digital images associated with this text may be visually quite different. This results in user frustration due to inefficient navigation through the search result and well as inefficient use of network and computational resources to communicate, perform, and repeat these searches by the service provider system.

Additionally, conventional search techniques that support a sequence of search inputs typically rely on a second order ranking This involves a base search query which is then used by a search provider system to further refine and filter search results based on subsequent search queries. Search results of a first search query, for instance, may be re-ranked and displayed by a service provider system as part of second order ranking that is reprocessed based on a second search query. This hinders real time output by conventional service provider systems.

Further, conventional search techniques do not support an amount of focus (i.e., weighting) to be given to particular items as part of a search query. These conventional techniques also lack flexibility to do this as supporting multiple types of items as part of a search query, e.g., digital images and text, and thus may have limited accuracy and result in inefficient use of computational resources caused by repeated searches due to these inaccuracies.

SUMMARY

Visually guided machine-learning language model and embedding techniques are described that overcome the challenges of conventional techniques in a variety of ways. In one example, a model is trained to support a visually guided machine-learning embedding space that supports visual intuition as to "what" is represented by text. Training of the model, for instance, may begin with a fixed image embedding space, to which, a text encoder is then trained using digital images and text associated with the digital images. This causes text describing similar visual concepts to be clustered together in the visually guided language embedding space supported by the model, which is not possible using conventional techniques.

The visually guided language embedding space supported by the model, once trained, may then be used to support visual intuition as part of a variety of functionality. Examples of this functionality include text classification (e.g., to assign tags or categories to text), natural language understanding (e.g., machine reading comprehension and natural language processing), digital content searches (e.g., to locate digital images or videos based on a text query), speech recognition, text summarization (e.g., to shorten long sequences of text using natural language processing), and so forth.

In one such example, the visually guided language embedding space as implemented by the model may be leveraged as part of a multi-modal differential search to support search of digital images and other digital content with real-time focus adaptation which overcomes the challenges of conventional techniques. The visually guided language embedding space of the model, once trained, supports direct use of embedding generated from text and digital images. A mixed modal embedding, for instance, may be generated using the model by treating embedding of text and digital images as vectors and combining these vectors using relational operators (e.g., arithmetic operators including "+," "−", "×", "/", greater than, less than, logical operators, and so on) as part of vector algebra (e.g., linear algebra, scalar multiplication, and so on) to perform a search in the embedding space implemented by the model. Weights may also be employed to specify the emphasis of each constraint, i.e., individual items in the search query. In this way, multimodal search is implemented through use of the visually guided language embedding space that may be performed in real time without use of second order rankings and further may support weights to different items (e.g., text and/or digital images) in the search query, which is not possible using conventional search techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
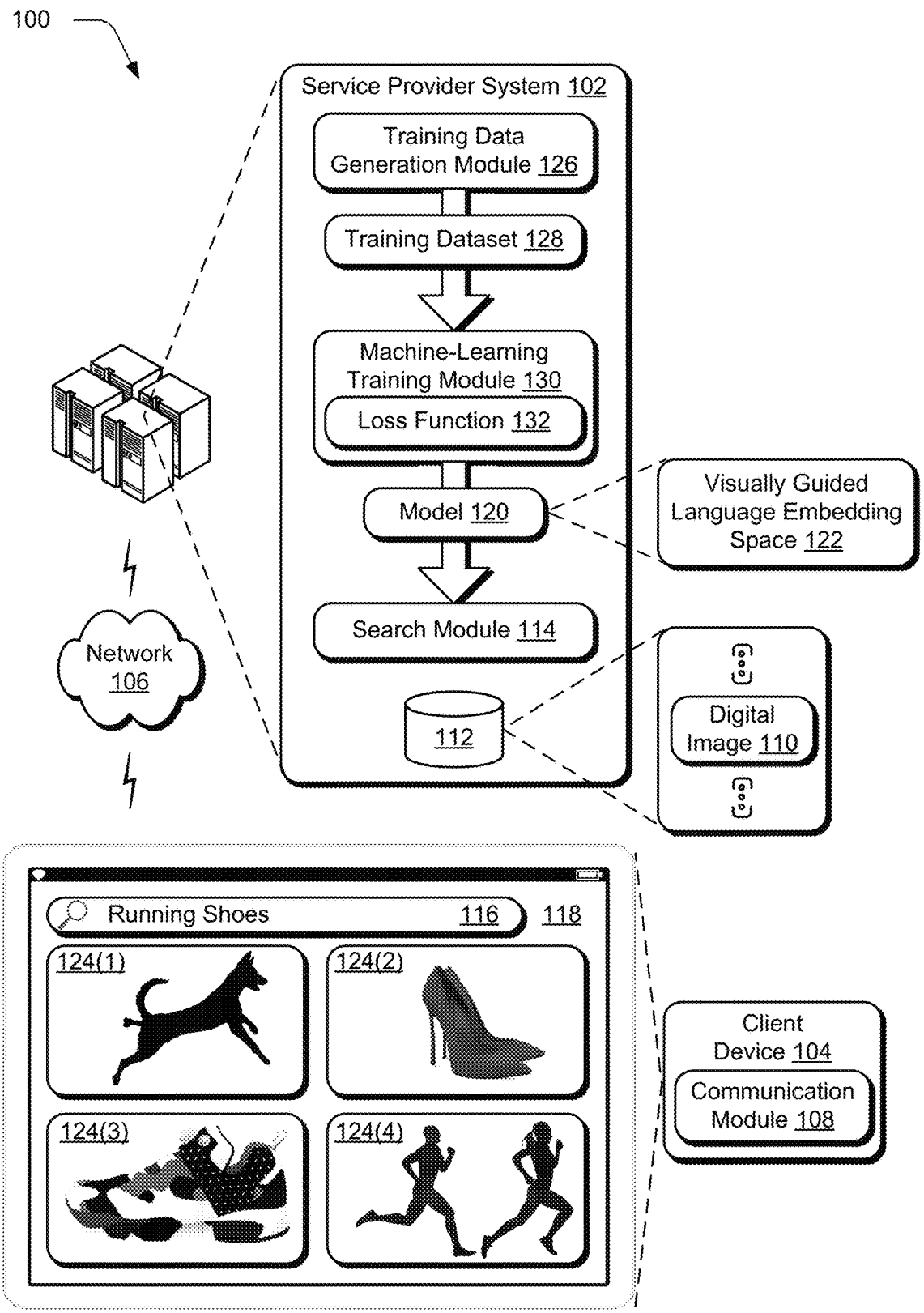
FIG. 1 is an illustration of a digital medium environment in an example implementation that is operable to employ visually guided machine-learning model and embedding techniques described herein.

Language models are used to support a variety of functionality by service provider systems via machine learning. However, conventional language models are solely text based and as such do not support visual intuition regarding digital images that are associated with text that is used to describe the digital images, e.g., captions. As a result, service provider systems that rely on conventional language models to address visual concepts may cause inaccuracies in text classification, natural language understanding, digital content searches, speech recognition, text summarization, and so on. This is due to a lack of these conventional techniques to intuit that the corresponding digital content is visually similar in this example, even though the text may be quite different.

Accordingly, machine-learning techniques and systems are described in which a model is trained to support a visually guided machine-learning embedding space that supports visual intuition as to "what" is represented by text. In one example, training of the model begins with a fixed image embedding space, to which, a text encoder is then trained using digital images and text associated with the digital images. This causes text describing similar visual concepts to be clustered together in the visually guided language embedding space supported by the model. In this way, the text and digital image embeddings are usable directly within the visually guided machine learning embedding space and as such are directly comparable to each other (e.g., without further modification) to determine similarity. For example, a text embedding generated based on text is usable to determine similarity to a digital image embedding generated based on a digital image without further modification, e.g., through use of comparison metrics based on respective vectors as described below. As a result, similarity of the text to the digital image may be readily determined in real time, which is not possible using conventional techniques.

The image embedding space, for instance, that serves as a basis for the visually guided language embedding space implemented by the model may be extracted using a layer in a neural network before a SoftMax layer of ResNet models (e.g., Residual Network models that implement residual learning that learn low/middle/high level features of digital images), VGG models (e.g., deep convolutional networks for object recognition from the Visual Geometry Group), or any other such model. This layer is used as an initial stage of text encoder of the model. After this, the text encoder is configured to capture sequential information of the text, e.g., through use of stacked cells of a long short-term memory (LSTM) network. A fully connected layer may also be employed such that a text embedding (e.g., vector) formed by a text encoder of the model has a matching length to a digital image embedding (e.g., vector) generated by a digital image encoder. The text embedding is then used in conjunction with a corresponding digital image embedding using a loss function by backpropagating a loss to train the text encoder of the model. In this way, the model may be trained to gain visual intuition from corresponding text.

The visually guided language embedding space supported by the model, once trained, may then be used to implement a variety of functionality. Examples of this functionality include text classification (e.g., to assign tags or categories to text), natural language understanding (e.g., machine reading comprehension and natural language processing), digital content searches (e.g., to locate digital images or videos based on a text query), speech recognition, text summarization (e.g., to shorten long sequences of text using natural language processing), and so forth.

As previously described, conventional search techniques that support a sequence of search inputs typically rely on a second order ranking, which hinders real time output. Further, conventional search techniques do not support an amount of focus (i.e., weighting) to be given to particular items as part of a search query. These conventional search techniques do not support multiple types of items as part of a single search query, e.g., digital images and text. Thus, conventional techniques may have limited accuracy and result in inefficient use of computational resources caused by repeated searches due to these inaccuracies.

Accordingly, the visually guided language embedding space as implemented by the model as described above may be leveraged as part of a multi-modal differential search to support search of digital images and other digital content with real-time focus adaptation which overcomes the challenges of conventional techniques. The visually guided language embedding space of the model, once trained, supports direct use of embeddings generated from text and digital images through respective vectors as described above. A mixed modal embedding, for instance, may be generated using the model based on a combination of text and digital images. This is performed by treating embeddings of text and digital images as vectors and combining these vectors using relational operators (e.g., logical operators, arithmetic operators such as "+," "−," "×", "/", scalar multiplication, greater than, less than, etc.) as part of a vector algebra (e.g., linear algebra, vector addition or subtraction, scalar multiplication) to perform a search in the embedding space implemented by the model.

The mixed modal embedding, for instance, can be used as part of a nearest neighbor search to locate similar digital images (e.g., based on least square distance or other comparison metric such as Jaccard distance, Cosine Similarity, and so on) between the new mixed modal embedding and the embeddings of digital images and/or text maintained in a storage device. Weights may also be employed to specify the emphasis of each constraint, i.e., individual items in the search query. The weights, for instance, may be specified manually by a user (e.g., through use of a slide bar), specified automatically based on a modal type of constraint (e.g., to give different weights to text versus digital images), and so forth. In this way, multimodal search is implemented through use of the visually guided language embedding space that may be performed in real time without use of second order rankings through use of the embeddings and further may support weights to different items (e.g., text and/or digital images) in the search query, which is not possible using conventional search techniques.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ visually guided machine-learning language model and embedding techniques described herein. The illustrated environment 100 includes a service provider system 102 and a client device 104 that are communicatively coupled via a network 106, e.g., the Internet. The service provider system 102 and the client device 104 may be implemented using a variety of different configurations of computing devices.

A computing device, for instance, may be configured as a desktop computer, a laptop computer, a mobile device (e.g., assuming a handheld configuration such as a tablet or mobile phone as illustrated for the client device 104), and so forth. Thus, the computing device may range from a full resource device with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as shown for the service provider system 102 and as described further in relation to FIG. 18.

The client device 104 as illustrated includes a communication module 108 (e.g., browser or network-enabled application) that is executable using a computer-readable storage medium and processing system to access functionality of the service provider system 102 via the network 106. This functionality may take a variety of forms, such as for a search of digital images 110 illustrated as stored in a storage device 112 using a search module 114. Other examples of features that may be supported by the functionality described herein include machine translation, text retrieval, speech recognition, text summarization, natural language understanding, and so forth as further described in relation to FIG. 3. Further, although this functionality is illustrated as implemented by the service provider system 102, the functionality may be implemented in whole in in part locally by the client device 104.

A communication module 108, for instance, may receive a text query 116 via a user interface 118 for "running shoes." The text query 116 is communicated via the network 106 and processed by a search module 114. The search module 114 employs a visually guided machine-learning language model (hereinafter referred to as "model" 120) to implement a visually guided language embedding space 122 to perform the search. This visually guided language embedding space 122 overcomes the limitations of conventional solely text-based language models through implementation as a single unified text-and-digital image embedding space in which text embeddings are digital image embeddings are directly usable.

As previously described, conventional language models are prone to error due to an inability to visually intuit "what" is represented by the text, e.g., in corresponding digital images 110. This is also due to a lack of ability to support flexibility on variations of language descriptions as well as variations of language descriptions for different objects. In the illustrated example, for instance, a text query "running shoes" may be matched by conventional systems to digital images having tags of either pivot of text (i.e., a text term that is not a stop word and used as a basis to perform a search), examples of which include a digital image 124(1) of a running dog, a digital image 124(3) of a shoe, and a digital image 124(4) of people running along with an actual goal of the search, e.g., a digital image 124(3) of a running shoe. Stop words are commonly used words that are filtered as not being relevant to a search or other types of functionality as being generic, e.g., "and," "the," "a," "an," and so on.

In the techniques described herein, however, a visually guided language embedding space 122 is generated for a model 120 as part of machine learning that overcomes these challenges with increased accuracy and computational efficiency over conventional techniques. For example, a search for "golden bowl" using the model 120 would limit and even eliminate a number of instances of inclusion of digital images of goldfish, gold ingots, and so forth as typically encountered in conventional techniques.

To do so, the digital medium environment 100 described herein implements a variety of functionality, which may be performed together or in sub-combinations as further described in respective sections of the following discussion. Thus, functionality described in any one section may be used in combination with functionality in any of the other sections.

In the illustrated example, the service provider system 102 employs a training data generation module 126 to generate a training dataset 128. The training dataset 128 is used to train the model 120 as part of machine learning by a machine-learning training module 130 using a loss function 132. The training dataset 128 may be based on a variety of different types of text that may be associated with digital images, e.g., title-based training datasets, query-based training datasets, and other types of digital image and text associations.

In the Visually Guided Machine-learning Language Model section that follows in the subsequent discussion, training of the model 120 begins with a fixed image embedding space, to which, a text encoder is then trained using digital images and text associated with the digital images. This causes text describing similar visual concepts to be clustered together in the visually guided language embedding space 122 supported by the model 120. Further, this may speed training of the model 120 through use of a preconfigured image embedding space by training an associated text encoder, solely, although other examples are also contemplated.

Figure 2:
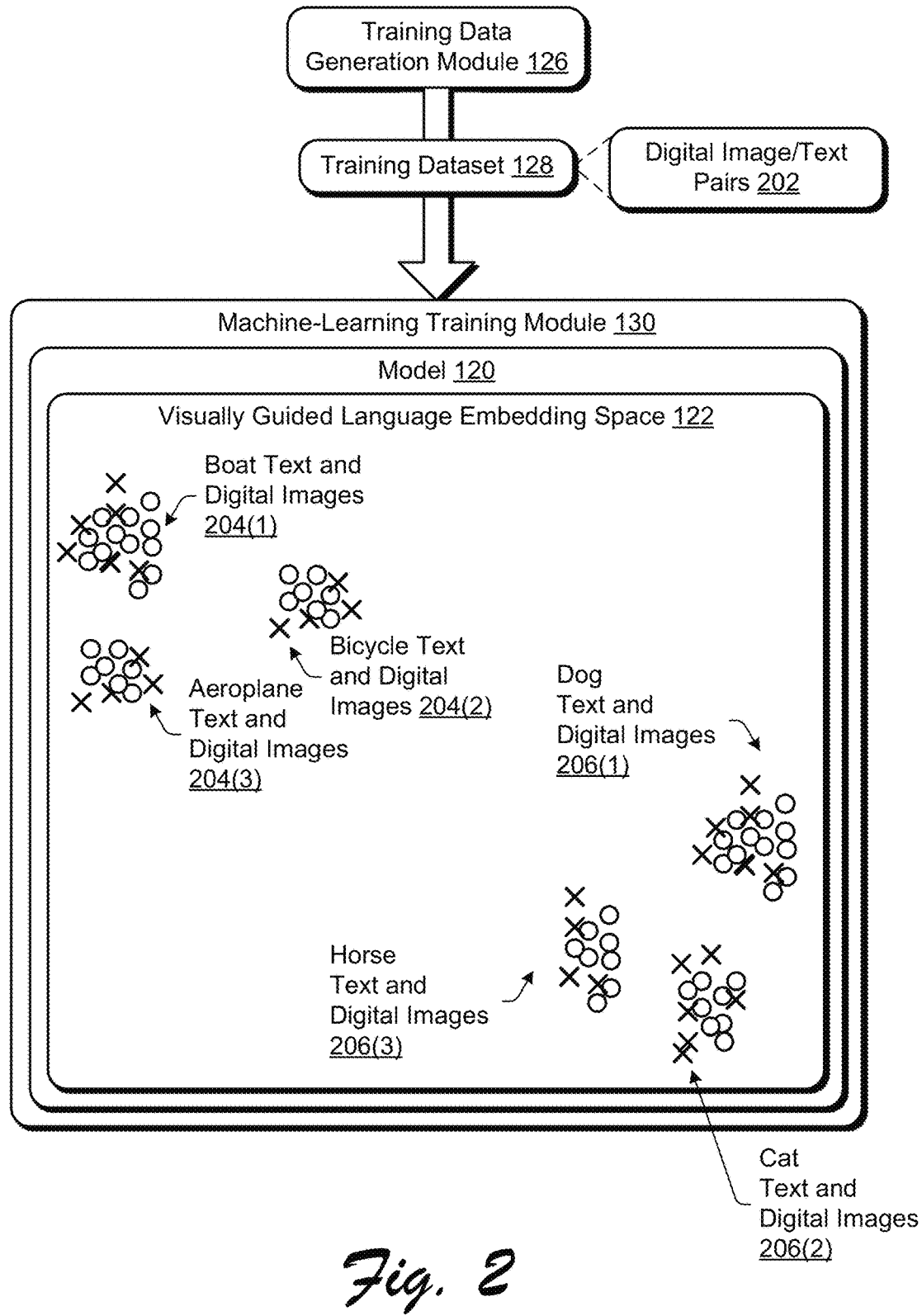
FIG. 2 is a graphical example of clustering within a visually guided language embedding space as implemented by a model of FIG. 1.

As shown in an example 200 of FIG. 2, for instance, text embeddings generated from text (e.g., using a recurrent neural network) are represented as circles and digital image embeddings generated from digital images (e.g., using a convolutional neural network) are represented by X's. Both types of embeddings are disposed within and usable directly within a single unified text-and-digital image embedding space.

Training of the model 120 is performed using digital image/text pairs 202 of a training dataset 128. This supports visual intuition between text and digital images, such that similar visual concepts expressed by text and digital images are clustered together and are distinguishable from other clusters that do not express similar visual concepts. Illustrated examples of clusters of vehicle types that are disposed proximal to each other include boat text and digital images 204(1), bicycle text and digital images 204(2), and aeroplane text and digital images 204(3). Other cluster types are also disposed together, but apart from the vehicle cluster types, illustrated examples includes types of animals such as dog text and digital images 206(1), cat text and digital images 206(2), and horse text and digital images 206(3).

The image embedding space, for instance, that serves as a basis for the visually guided language embedding space 122 may be extracted using a layer in a neural network before a SoftMax layer of ResNet models (e.g., Residual Network models that implement residual learning that learn low/middle/high level features of digital images), VGG models (e.g., deep convolutional networks for object recognition from the Visual Geometry Group), or any other such model. This layer is used as an initial stage of text encoder of the model 120. After this, the text encoder is configured to capture sequential information of the text, e.g., through use of stacked cells of a long short-term memory (LSTM) network. A fully connected layer may also be employed such that a text embedding (e.g., vector) formed by a text encoder of the model 120 has a matching length to a digital image embedding (e.g., vector) generated by a digital image encoder. In this way, the model 120 may be trained to gain visual intuition from corresponding text, further discussion of which may be found in relation to a corresponding section.

The visually guided language embedding space 122 supported by the model 120 may be used to implement a variety of functionality. As further described in the Multi-Modal Differential Search with Real-Time Focus Adaptation section, conventional search techniques that support a sequence of search inputs typically rely on a second order ranking This involves a base search query which is then used by a search provider system to further refine and filter search results based on subsequent search queries. Search results of a first search query, for instance, may be re-ranked and displayed as part of second order ranking that is reprocessed based on a second search query, which hinders real time output by conventional service provider systems. Thus, a search based on a search query in conventional techniques is typically performed, a result of which is then refined over one or more iterations. Additionally, conventional search techniques do not support an amount of focus (i.e., weighting) to be given to individual items as part of a search query. These conventional techniques also lack flexibility to do this as supporting multiple types of items as part of a search query, e.g., digital images and text, and thus may have limited accuracy and result in inefficient use of computational resources caused by repeated searches due to these inaccuracies.

Accordingly, the visually guided language embedding space 122 described above is leveraged as part of multi-modal differential search by the search module 114. This supports search of digital images 110 with real-time focus adaptation which overcomes the challenges of conventional techniques. The visually guided language embedding space 122 of the model 120, once trained, supports direct use of embeddings generated from text and digital images and as such supports real time search and output in a user interface. Mixed modal embedding are also supported by the search module 114 using the model by treating embedding as vectors and combining these vectors using arithmetic operators (e.g., "+," "−," "×", "/", and so on) as part of a vector algebra to perform a search.

So, for example, an <image embedding1>, a <text embedding1>, a <text embedding2>, and an <image embedding2> can be combined to form a search query as a resulting mixed modal embedding:

<image embedding1>+w1*<text embedding1>−w2*<text embedding2>+w3*<image embedding2> where w1, w2 and w3 are weights.

This resulting mixed embedding can be used as part of a nearest neighbor search or other comparison technique by the search module 114 to locate similar digital images 120 based on a distance metric such as least square distance between the new mixed embedding and the embeddings of digital images 110 in the storage device 112. These results effectively satisfy the constraints specified in the implicit equation of the resulting embedding above to locate a digital image 110 similar to image1, having some of the content of text1, not having some of the content of text2, and having some of the features of image2. The weights "w1," "w2," "w3" specify an amount of emphasis of each constraint on the search. Thus, weights may be applied to some or all of the components of the mixed modal embedding. In this way, multi-modal search is implemented by the search module 114 through use of the visually guided language embedding space 122 that may be performed in real time without use of second order rankings and further may support weights to different items (e.g., text and/or digital images) in the search query. Further discussion of which is included in a corresponding section.

The training data generation module 126 may also employ techniques to generate a training dataset 128 that increases the accuracy in training the model 120 as described in the Training Dataset Generation section in the following discussion. In machine learning as implemented by the machine-learning training module 130, positive digital image samples are used as instances of a "correct" correspondence with text, whereas a negative digital image sample is used to increase discrimination by the model 120, e.g., is selected in a way that the negative digital image sample does not belong in a same category with the positive digital image sample.

The training data generation module 126, for instance, may generate the negative digital image samples automatically and without user intervention in a manner that increases accuracy of the model 120. To do so, the training data generation module 126 selects a positive digital image sample from a plurality of digital images that has associated text, e.g., text queries or titles as described above.

The training data generation module 126 then generates a subset from a plurality of digital images that does not include digital images from the plurality of digital images that have any of the terms associated with the associated text of the positive digital image sample. For example, suppose the positive digital image sample has associated text of "man on a motorbike." Digital images are excluded from the subset having digital images associated with either "man" or "motorbike," i.e., are "filtered out." The subset is then used to select a negative digital image sample. The training data generation module 126, for instance, may select a digital image in the subset, automatically and without user intervention, that is the "closest" (through comparison of respective embeddings) to the positive digital image sample, e.g., by a least squared distance. This may be performed, for instance, for the query-based training dataset described above. In this way, the negative digital images sample may increase an ability of the model 120 to discriminate between "good" and "bad" examples of digital images and text associations.

In another example, even "harder" negative digital image samples may be generated by the training data generation module 126, automatically and without user intervention. To do so in this example, the training data generation module 126 also generates a subset from a plurality of digital images that excludes digital images from the plurality of digital images that have each of the terms, excluding stop words (i.e., are "pivots"), in the text associated with the positive digital image sample. The training data generation module 126 then selects the negative digital image sample from this subset. For example, suppose again that the positive digital image sample has associated text of "man on a motorbike." Digital images are then filtered from the plurality of digital images that have both "man" or "motorbike." The subset resulting from the filtering is then used to select a negative digital image sample. This may be performed, for instance, for title-based training data which typically includes significant amounts of text. As a result, the model 120 is further able to discriminate between "good" and "bad" examples of digital image and text associations as part of training.

The machine-learning training module 130 may also implement a loss function 132 as part of training and use of the model 120 that further increases accuracy and computational efficiency of the model 120, as described in the Loss Function section in the following discussion. Continuing with the example above, the machine-learning training module 130 trains the model 120 using a positive digital image sample, a negative digital image sample, and text associated with the positive digital image sample. A text embedding is generated from the text using machine learning by the machine-learning training module 130, e.g., through a text encoder implemented by a recurrent neural network (RNN). A positive image embedding is also generated from the positive digital image sample and a negative image embedding generated from the negative digital image sample, e.g., through convolutional neural network encoder implemented by a convolutional neural network (CNN).

The loss function 132 is configured in this example to evaluate a loss between the text embedding and the positive image embedding separately from a loss between the text embedding and the negative image embedding. This causes the positive image embedding to have increased similarity with respect to the text embeddings (and therefore cluster together) and the negative image embedding to have increased dissimilarity with respect to the text embedding during training. This improves an ability of the model 120, and more particularly a text encoder trained as part of the model 120, to discriminate between these samples and improves model 120 accuracy. In this way, accuracy of the model 120 is increased over conventional loss functions that did not support such an ability to separately address these losses as further described in the corresponding section in the following discussion.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Visually Guided Machine-Learning Language Model

Figure 3:
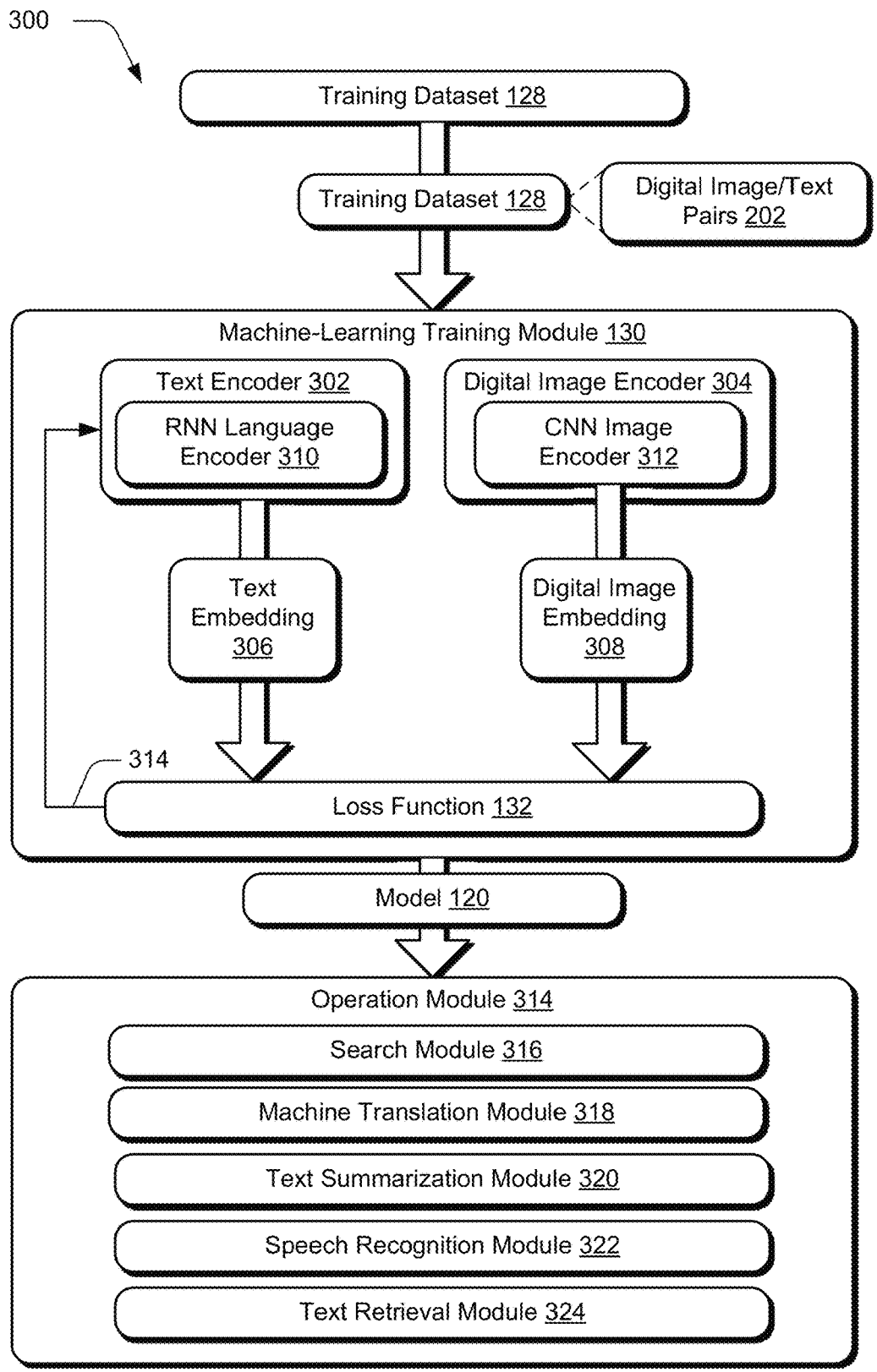
FIG. 3 depicts a system showing operation of a machine-learning training module of FIG. 1 in greater detail as generating embeddings and using a loss function to train a model to support a single unified visually guided language embedding space of FIG. 2.
Figure 4:
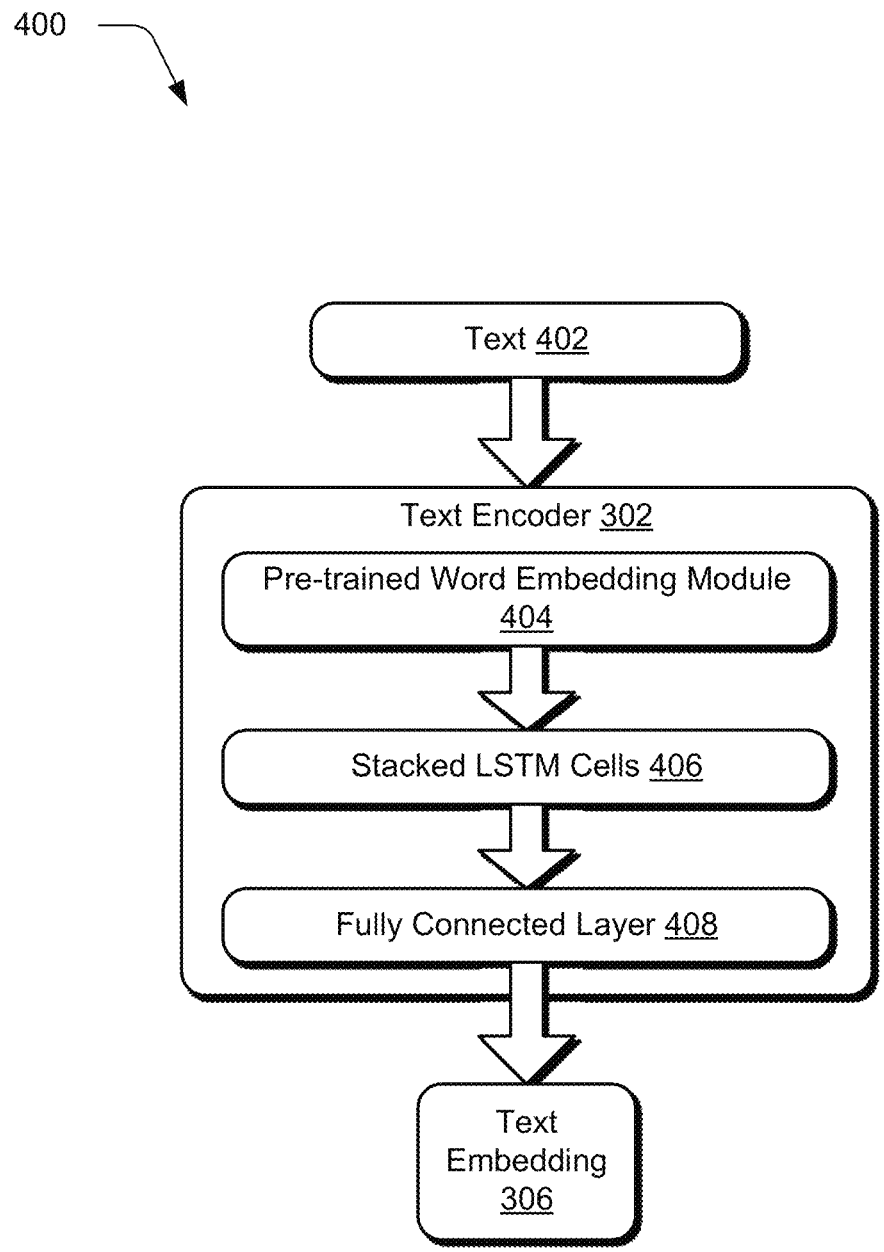
FIG. 4 depicts a system showing operation of a text embedding module of FIG. 3 in greater detail to generate a text embedding from text.
Figure 5:
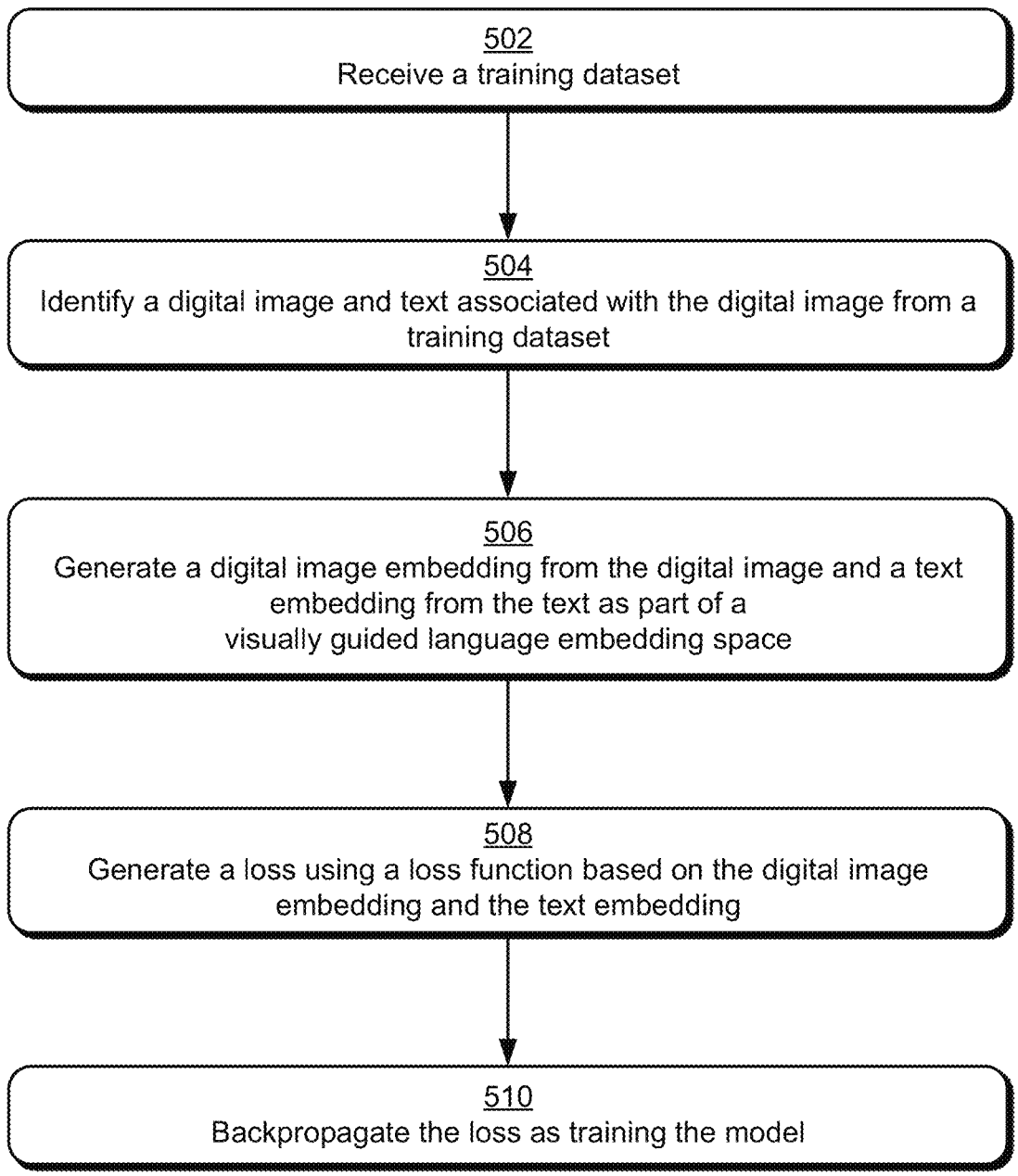
FIG. 5 is a flow diagram depicting a procedure in an example implementation in which a visually guided language embedding space is generated by training a model using machine learning using digital images and associated text.

FIG. 3 depicts a system 300 showing operation of the machine-learning training module 130 in greater detail as generating embeddings and using the loss function 132 to train a model 120 to support a single visually guided language embedding space 122 of FIG. 2. FIG. 4 depicts a system 400 showing operation of a text embedding module of FIG. 3 in greater detail to generate a text embedding from text. FIG. 5 depicts a procedure 500 in an example implementation in which a visually guided language embedding space 122 is generated by training a model 120 using machine learning based on digital images and associated text.

Figure 6:
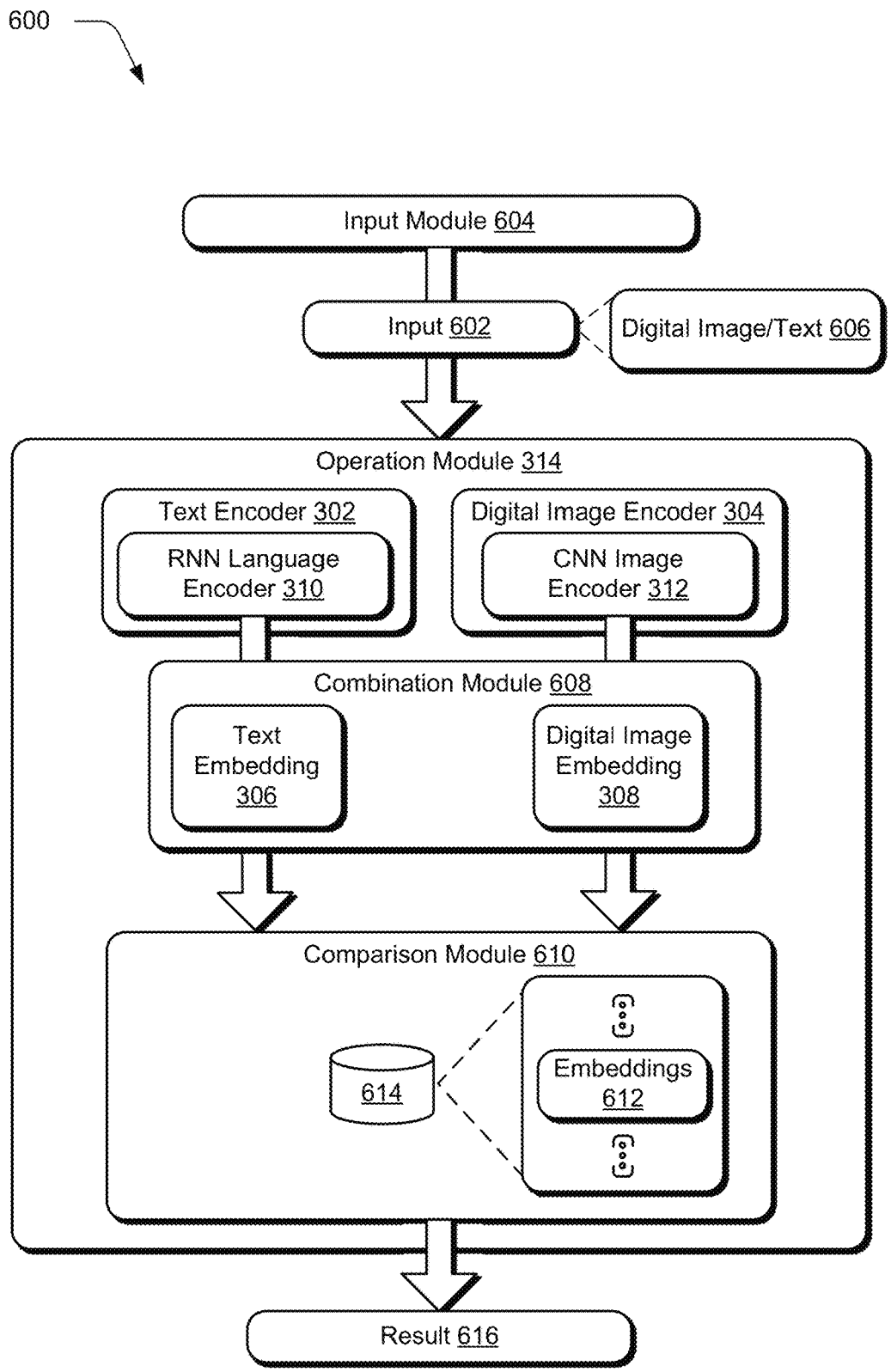
FIG. 6 depicts a system in which a model trained using the system of FIG. 3 and the procedure of FIG. 4 is used to implement machine-learning functionality, examples of which include search, machine translation, text summarization, speech recognition, and/or text retrieval.
Figure 7:
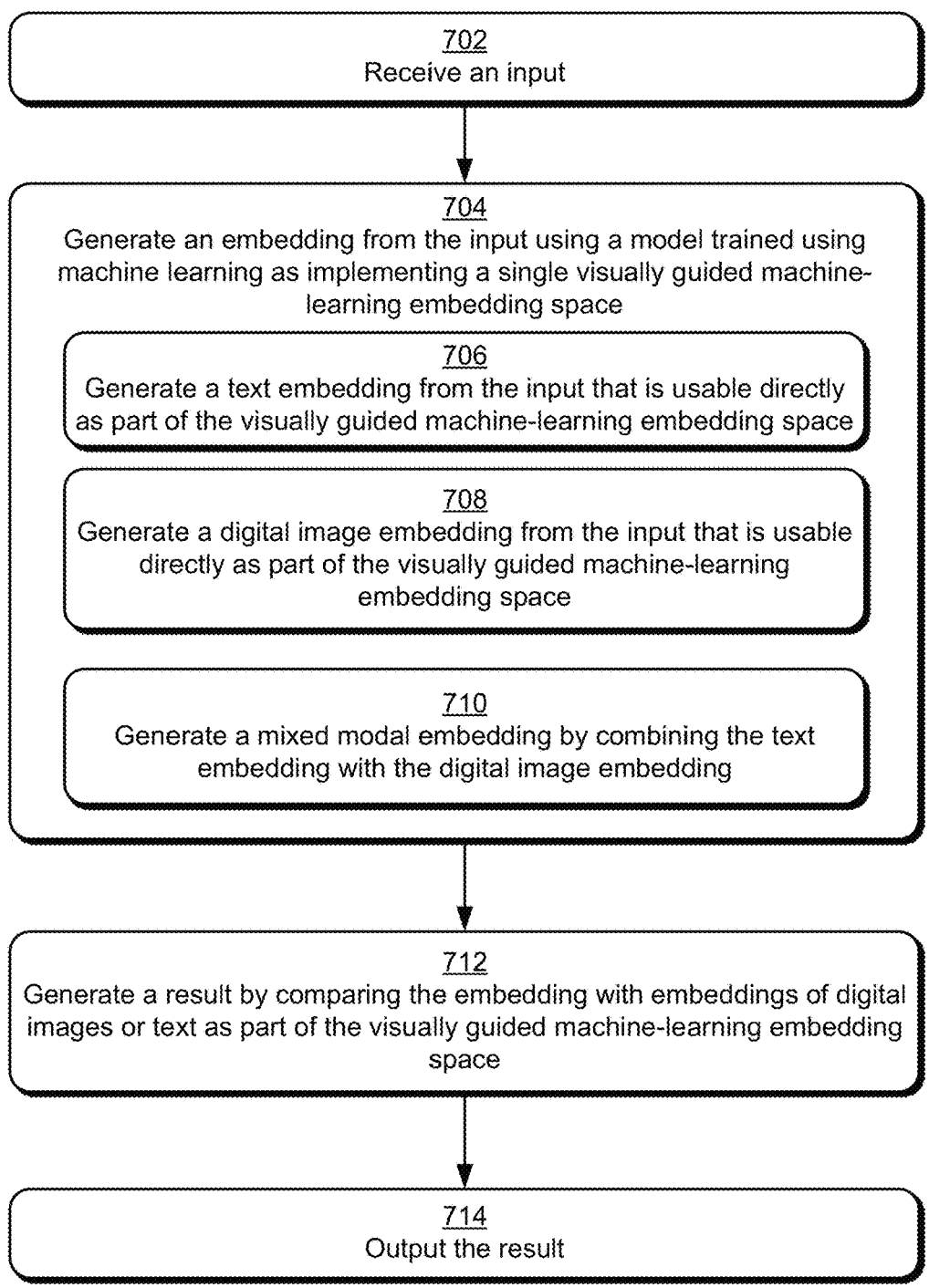
FIG. 7 depicts a procedure in an example implementation in which a comparison of an embedding generated from an input with embeddings of digital images or text as part of a visually guided-machine-learning embedding space are used to support a variety of machine-learning operations.

FIG. 6 depicts a system 600 in which a model trained using the system 300 of FIG. 3 and the procedure 400 of FIG. 4 is used to implement machine-learning functionality, examples of which include search, machine translation, text summarization, speech recognition, and/or text retrieval. FIG. 7 depicts a procedure 700 in an example implementation in which a comparison of an embedding generated from an input with embeddings of digital images or text as part of a visually guided-machine-learning embedding space are used to support a variety of machine-learning operations.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made interchangeably to FIGS. 1-7.

As described above, conventional language models employ text, solely, for training as part of machine learning. As such, conventional language models do not possess limited visual intuition regarding "what" is expressed by the text. Therefore, these conventional language models may result in inaccuracies when confronted with text having visual information, e.g., bicycle and motorbike may not lie in clusters that are close by each other in an embedding space even those this text may describe similar visual concepts. As such, text embeddings generated by conventional language models are also incapable of being used directly with image-based embeddings for applications beyond image retrieval, e.g., machine translation, text retrieval, speech recognition, text summarization, and so on.

Accordingly, techniques are described that configure the model 120 using machine-learning to implement a visually guided language embedding space 122 that supports visual intuition regarding "what" is expressed by text. Text and visual embeddings, for instance, are usable directly within the visually guided language embedding space 122, which supports clustering of similar text and visual concepts together. In this way, the visually guided language embedding space 122 supports applications beyond image retrieval which are not possible using conventional language models, e.g., machine translation, text retrieval, speech recognition, text summarization, and so on to address visual concepts expressed by the text. In the following discussion, an example of training the model 120 is first described, which is followed by a discussion of use of the trained model 120 as supporting a variety of machine-learning functionality.

To begin in this example, a training dataset 128 (block 502) is received by the machine-learning training module 130 from a training data generation module 126. The training dataset 128 includes digital image and text pairs 202 which may be obtained from a variety of different sources. In one example, the digital image and text pairs 202 include text queries used to perform a search of digital images that are user-selected as a result of the search. This is referred to as a query-based training dataset. In another example, the digital image and text pairs 202 include digital images and corresponding captions, i.e., a title-based training dataset. A variety of other examples are also contemplated, including a training dataset 128 that includes a triplet having positive digital image samples, negative digital image samples, and text associated with the positive digital image samples as further described in the Training Dataset Generation section in the following discussion.

As part of the training, the machine-learning training module 130 first identifies a digital image and text associated with the digital image from the training dataset 128 (block 504), e.g., a text query and associated digital image, digital image and caption, and so forth. The machine-learning training module 130 then generates a digital image embedding 308 from the digital image and a text embedding 306 from the text as part of a visually guided language embedding space 122 (block 506), e.g., a single unified text-and-digital image embedding space in which text and digital image embeddings are directly usable.

To do so, the machine-learning training module 130 includes a digital image encoder 304 that is trained, using machine learning, to generate the digital image embedding 308, e.g., as vectors having a length of 2048. The digital image encoder 304, for instance, includes a convolutional neural network (CNN) image encoder 312 to generate the digital image embeddings 308 as describing content included in the digital images using vectors. The CNN image encoder 312 includes a series of convolution layers with filters and pooling layers to extract and learn features of the digital images in order to generate the embeddings. In an implementation, the CNN image encoder 312 is pre-trained to implement a fixed image embedding space, to which text embedding are then trained.

The text encoder 302 in the illustrated example generates the text embedding 306 (e.g., a vector also having a length of 2048) based on the text using a recurrent neural network (RNN) language encoder 310. The RNN is type of neural network in which connections between nodes for a directed graph along a temporal sequence and may use an internal state to process sequences of inputs. The text encoder 302, for instance, may be used to generate the text embedding 306 for each single word at a time, in a sequence, and so on. Through use of stacked LSTM layers, the text encoder 302 may also address sequences of text and how that text relates to each other, e.g., based on ordering of the text. As such, the text encoder 302 may be configured to segment text into units of any desired/suitable length, e.g., single words, known or learned compound words or phrases, and so on. In this way, the text embedding 306 may capture an order of text, e.g., within a text query or text input, which is not possible in tag-based training approaches.

FIG. 4 depicts a system 400 showing an example of operation of the text encoder 302 in greater detail. The text encoder 302 includes a pre-trained word embedding module 404 having a dictionary containing an embedding for text 402 within a particular language, an example of which is known as "Fasttext." Word embeddings generated by the pre-trained word embedding module 404 provide semantic information regarding the text to the model 120.

An output of the pre-trained word embedding module 404 is then provided to a collection of stacked long short-term memory (LSTM) cells 406 to capture sequential information of the text, one to another. In this way, the LSTM cells 406 may capture information from single words to combinations of text such as known or learned compound words, phrases, and so on of any desired/suitable length. The output of the last cell of the stacked LSTM cells 406 is provided to a fully connected layer 408 to convert the vector size (e.g., from 300 to 2048), which results in the text embedding 306. This may be utilized by the machine-learning training module 130 to generate the text embedding for a variety of text, such as for text queries of a query-based training dataset, titles of a title-based training dataset, and so on as part of multi-task training as further described below.

In an implementation example, a fixed image embedding space of the digital image encoder 304 is used as a basis to train the text encoder 302, and as such support a single unified text-and-digital image embedding space. The image embedding space, for instance, may be extracted using a layer disposed just before a SoftMax layer of ResNet models (e.g., Residual Network models that implement residual learning that learn low/middle/high level features of digital images), VGG models (e.g., deep convolutional networks for object recognition from the Visual Geometry Group), or any other such model. Training of the model 120 then trains the text encoder 302 to generate text embeddings 306 that are made similar to the corresponding digital image embedding 308. As shown in FIG. 2, once trained this results in an ability to visualize text and features of digital images together in the same clusters.

As shown in the illustrated example of FIG. 3, the text embedding 306 and the digital image embedding 308 are then processed by a loss function 132 of the machine-learning training module 130 to generate a loss 314 (block 508). This loss 314 is backpropagated to train the model 120 (block 510), and more particularly the text encoder 302 of the model 120. As a result, text embeddings 306 generated by the text encoder 302 are made similar to associated digital image embeddings 308 generated by the digital image encoder. This causes the model 120 to implement the visually guided language embedding space 122.

In an implementation, the training dataset 128 includes a positive digital image sample, text associated with the positive digital image sample, and a negative digital image sample that is selected based on the positive digital image sample. Like the example above, the text embedding 306 is to be made similar, as part of training, to the digital image embedding. Therefore, the model 120 is trained in which the text embedding 306 is taken as an input along with its corresponding digital image as the positive digital image sample. The positive digital image sample is used to generate a positive image embedding. The negative digital image sample is selected that is visually similar, but not exact (e.g., does not include the same objects and/or express the same visual concepts) to the positive digital image sample. A negative image embedding is also generated by the digital image encoder 304 in this example.

This results in a triplet that includes a text embedding, a positive image embedding, and a negative image embedding. The loss function 132 is then used to generate a loss 314 based on this triplet to train the model 120, and more particularly the text encoder 302. As further described the Loss Function section in the following discussion, the loss function 132 may be configured to generate a loss between the text embedding and the positive image embedding separately from a loss between the text embedding and the negative image sample, which may then be averaged. This causes a distance, during training, between the text embedding and the positive image embedding within the embedding space to decrease and a distance between the text embedding and the negative image embedding to increase, which is not possible using conventional loss functions. The loss 314, for instance, may reduce a square distance between the text embedding and positive image embedding and increase a square distance between the text embedding and the negative image embedding.

As previously described, conventional language models are solely text based and thus do not support a visual intuition regarding "what" is being expressed by the text. As such, conventional language models are typically limited to use for tag-based image retrieval, and do not support a variety of other functionality. The model 120 described herein as supporting a visually guided language embedding space 122, on the other hand, may support a variety of functionality through use by an operation module 314 which represents functionality of "use" of the trained model 120. Thus, the model 120 as implemented by the operation module 314 may provide visual intuition in support of a variety of functionality. This includes search as implemented by a search module 316 (e.g., text-based digital image search), as well as machine translation as implemented by a machine translation module 318, text summarization (e.g., to shorten long sequences of text using natural language processing) as implemented by a text summarization module 320, speech recognition as implemented by a speech recognition module 322, text retrieval as implemented by a text retrieval module 324, and a variety of other functionality including text classification (e.g., to assign tags or categories to text), natural language understanding (e.g., machine reading comprehension and natural language processing), and so forth.

As shown in an example system 600 of FIG. 6, for instance, an input 602 is received (block 702) by an input module 604 that includes a digital image and/or text 606. The input 604 for instance, may be received locally at the client device 104 via a user interface, remotely by a service provider system 102 via a network 106, and so forth. The input 602 includes text and/or digital images that may be used as a basis to perform a variety of operations by the operation module 314, including searches, natural language processing, text summarization, speech recognition, text classification, and others as described above.

The operation module 314 then generates an embedding from the input 602 using a model 120 trained using machine-learning as implementing a single visually guided machine-learning embedding space 122 (block 704). The operation module 314, for instance, may generate a text embedding 306 from the input that is usable directly as part of the visually guided machine-learning embedding space (block 706) through use of the text encoder 302 trained as described above. The operation module 314 may also employ a digital image encoder 304 of the model 120 to generate a digital image embedding 308 from the input 602 that is usable directly as part of the visually guided machine-learning embedding space 122 (block 708). In this way, the model 120 supports use of text and/or digital images directly by the model 120, e.g., without further processing for use as part of the embedding space.

In some instances, the input (e.g., a search query input) includes both text and digital images. Accordingly, a combination module 608 may be utilized to combine the text embedding 306 with the digital image embedding to generate the embedding as a mixed-modal embedding (block 710). As described above, the text and digital image embeddings are usable directly within the visually guided machine learning embedding space and as such are directly comparable to each other (e.g., without further modification) to determine similarity, and thus similarity of text and digital images represented by the embeddings. This also support use of vector algebra to generate the mixed modal embeddings by combining the text and digital image embeddings as previously described, which may also be performed based on a weighting.

A result 616 is generated by a comparison module 610 of the operation module 314 by comparing the embedding of the input 602 with embeddings 612 of digital images or text (e.g., maintained in a storage device 614) as part of the visually guided machine-learning embedding space 122 (block 712). This is then output (block 714) in real time. The embeddings 610, for instance, may correspond to digital images 110. A search of the digital images 110 is performed by comparing embeddings of the digital images with an embedding generated based on the input, e.g., as part of a nearest neighbor search such as least squared distance. This may also be used to support natural language processing, text summarization, speech recognition, text classification, and other functionality.

Thus, the model 120, once trained, supports visual intuition regarding "what" is visually represented by text. The model 120, for instance, may be used to generate embeddings for text such as "boat" and "people" and generate new embeddings through support of arithmetic operations such as "<boat_embedding>+<people_embedding>" to support text inputs such as "people on boat," "man rowing a boat," and so forth. In another example, "<girl running in a park during sunset_embedding>" is usable as part of text inputs such as "girl in a park," "girl running in snow," "girl running in park in the afternoon," and so forth. As such, the visually guided machine-learning language model supports increased accuracy, richer inputs, and increased computational efficiency over conventional techniques that do not support this visual intuition, further discussion of which is included in the following section.

Multi-Modal Differential Search with Real-Time Focus Adaptation

Figure 8:
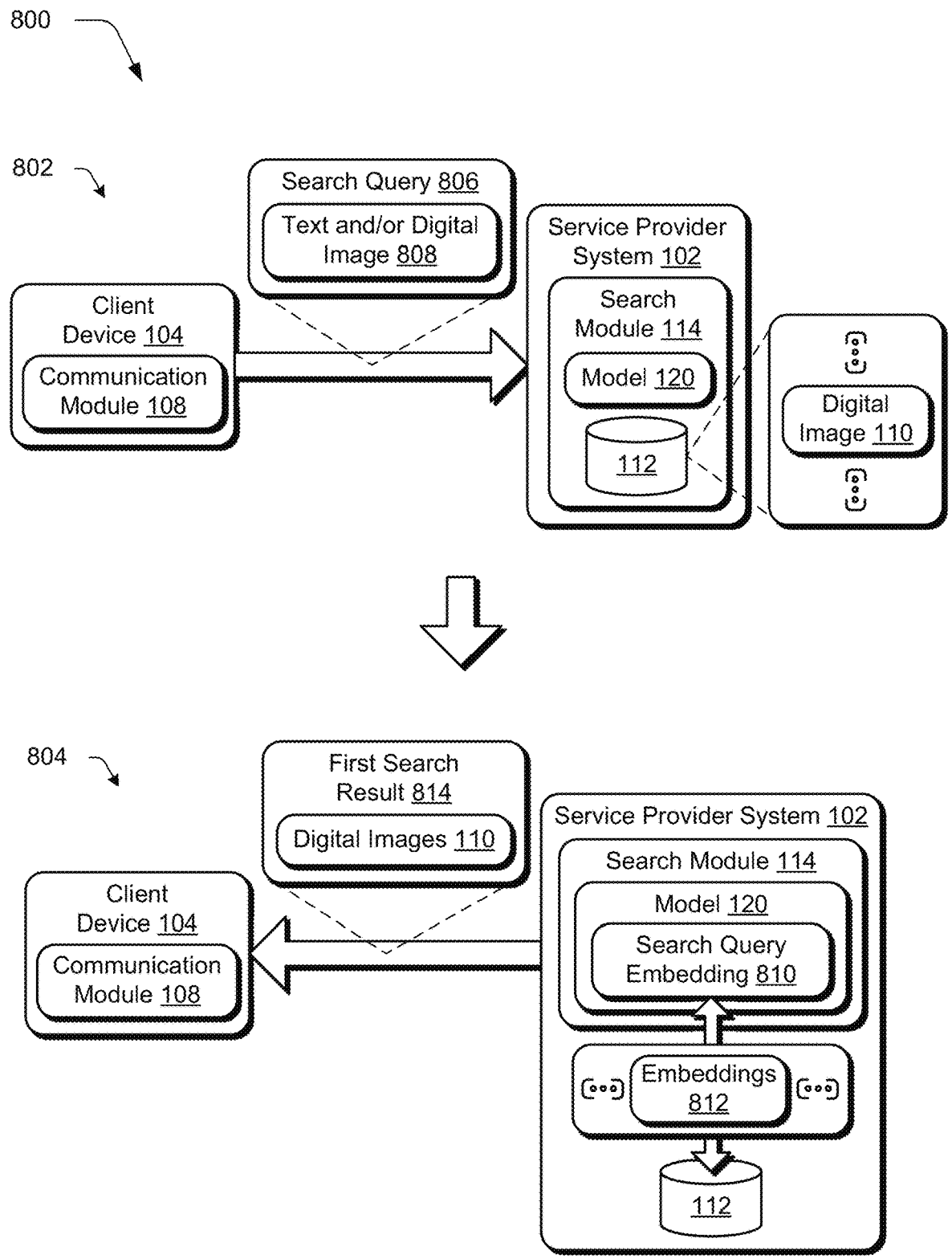
FIG. 8 depicts a system in an example implementation showing operation of the model of FIG. 1 implementing a single unified text-and-digital image embedding space as generating a first search result based on a search query using embeddings generated by the model.
Figure 9:
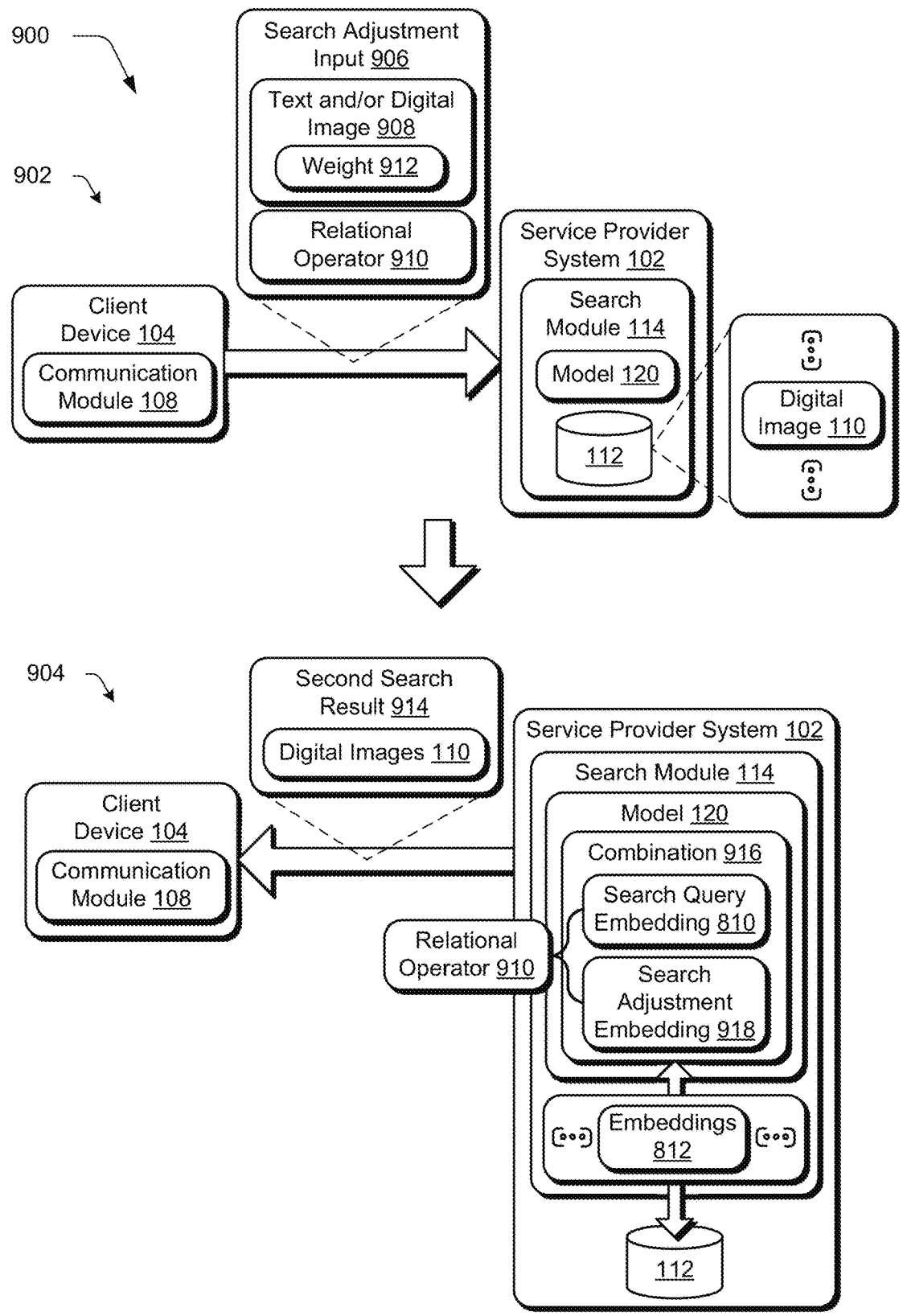
FIG. 9 depicts a system in an example implementation showing operation of the model as generating a second search result in real time based on embeddings generated by the model as a combination of a search query, a search adjustment input, and a relational operator without use of a second order ranking.
Figure 10:
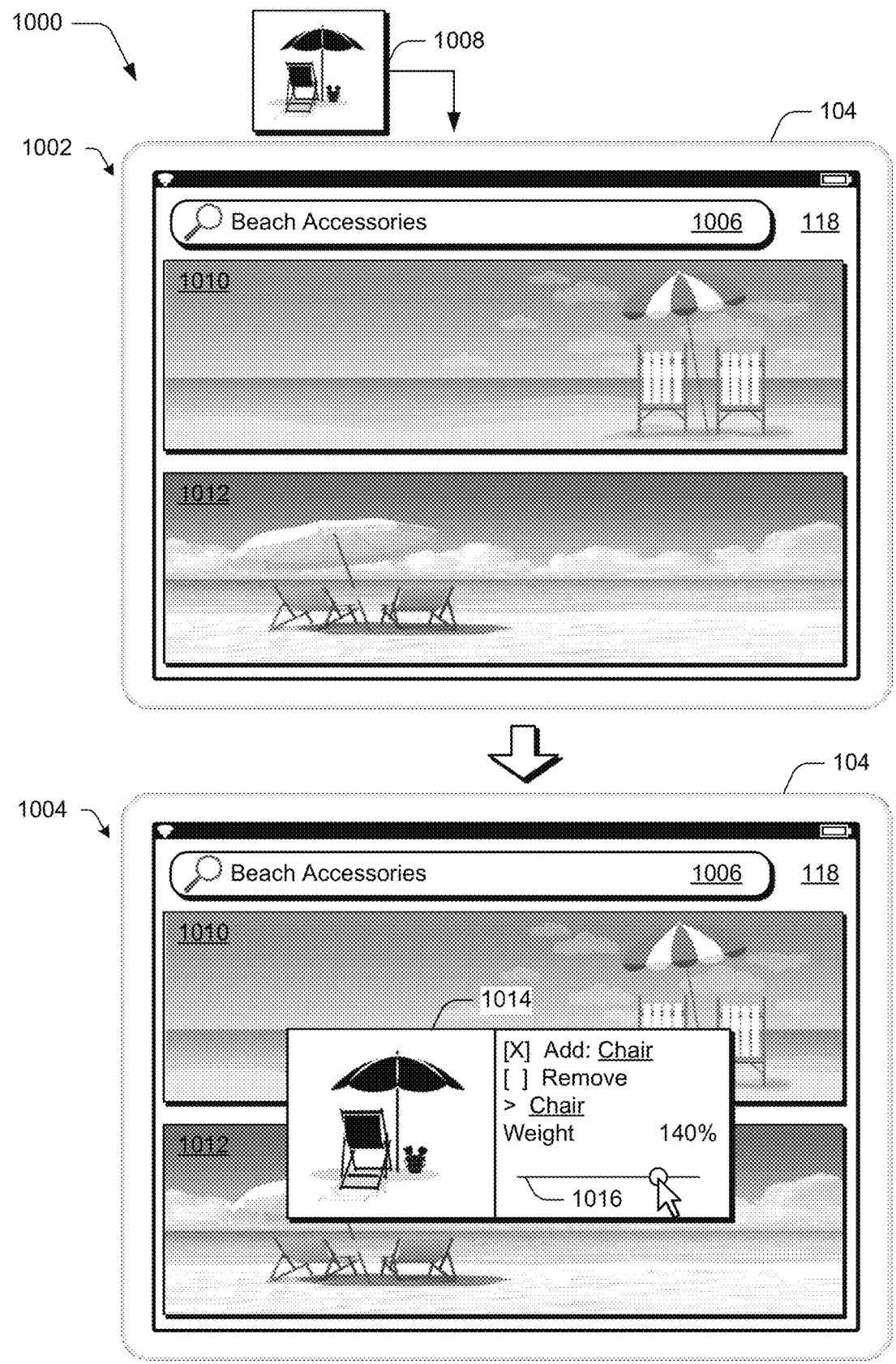
FIG. 10 depicts an example showing first and second stages of a user interface that include a first search result and a control operable to input the search adjustment query, respectively.
Figure 11:
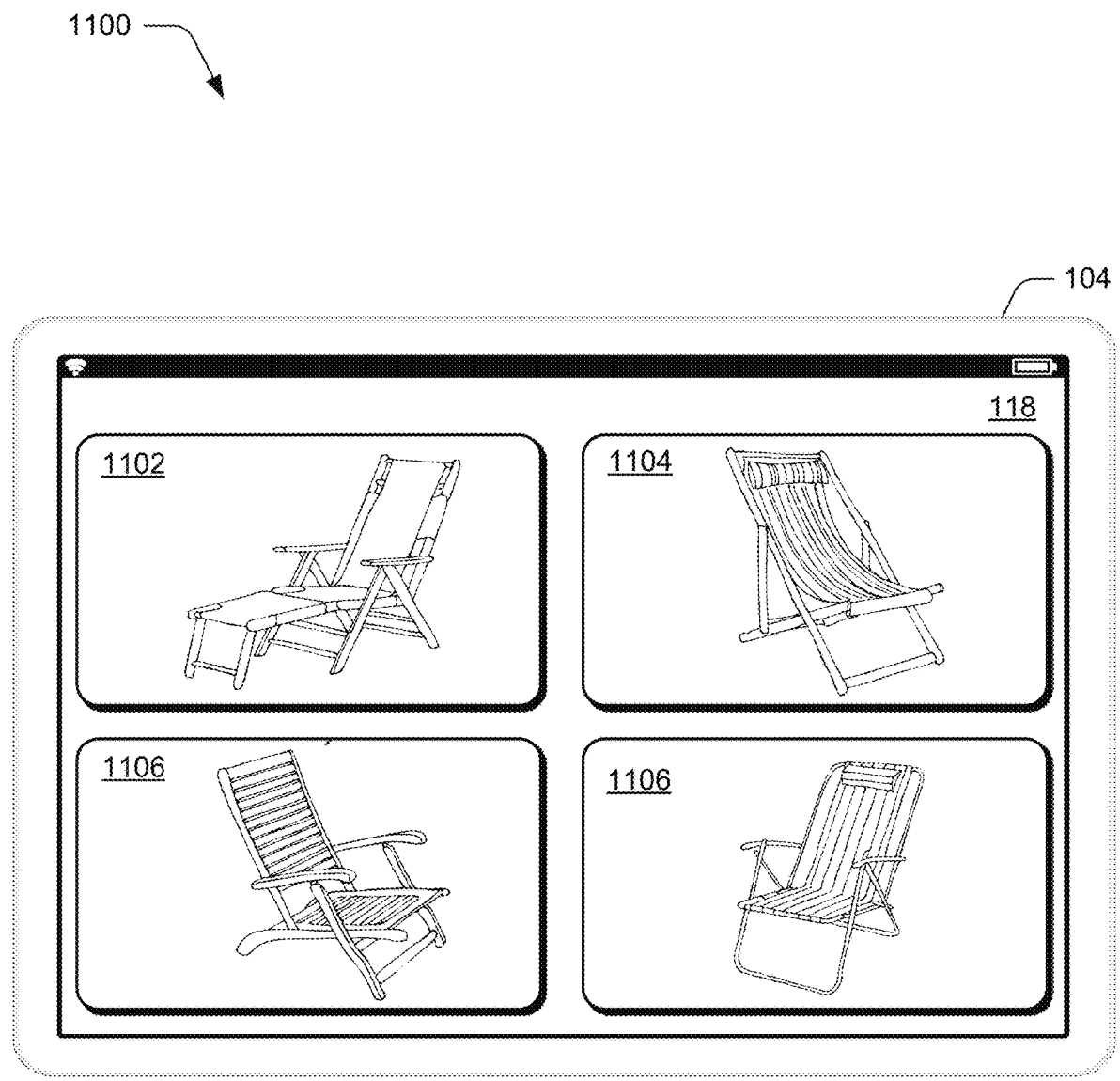
FIG. 11 depicts an example of a second search result generated based on the embedding generated as a combination of the search query, the search adjustment input, and the relational operator of FIG. 10.
Figure 12:
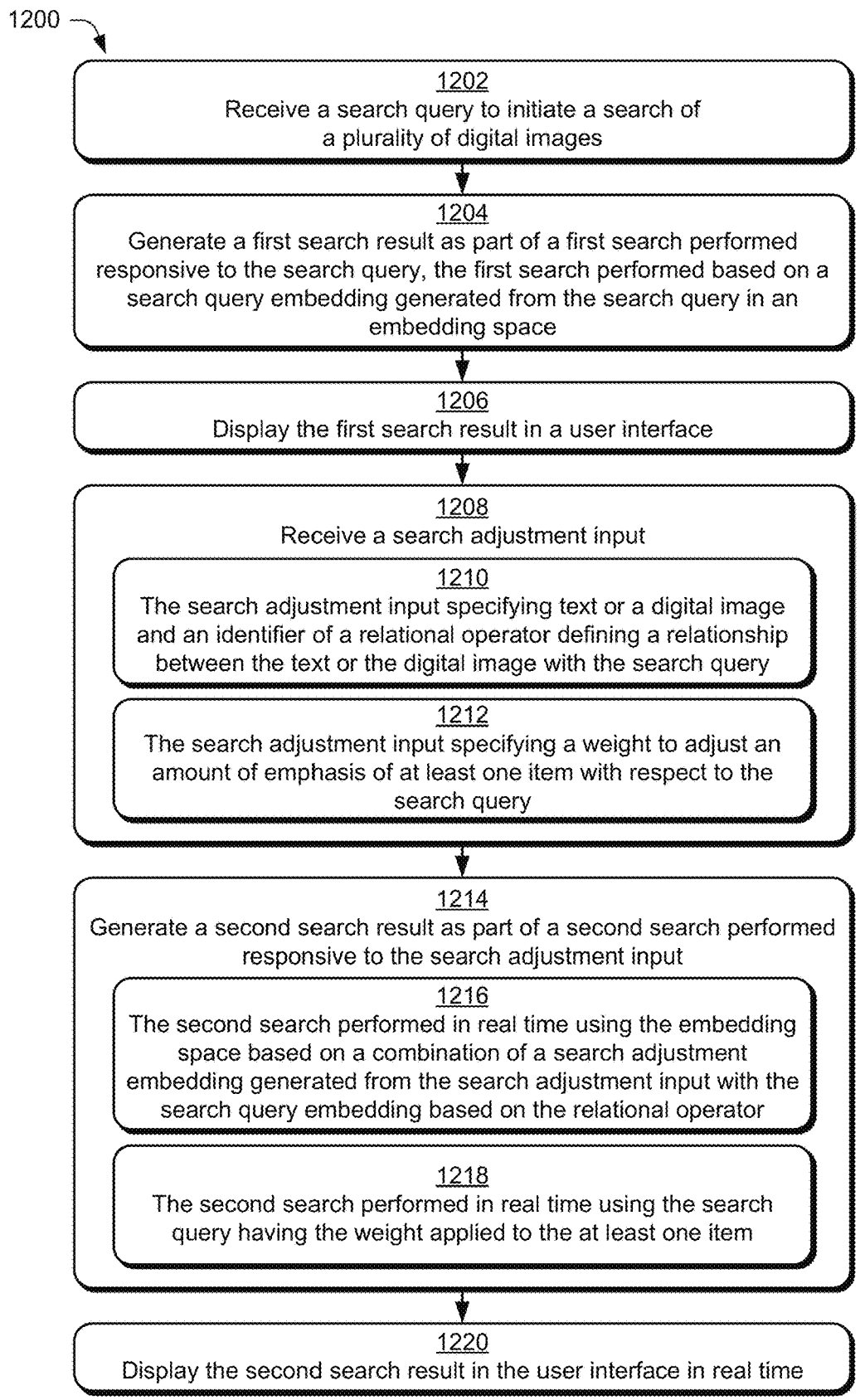
FIG. 12 is a flow diagram depicting a procedure in an example implementation of generating the first and second search results of FIGS. 10 and 11 based on the embeddings of the systems of FIGS. 8 and 9.

FIG. 8 depicts a system 800 in an example implementation showing operation of the model 120 as implementing a visually guided language embedding space to generate a first search result based on a search query using embeddings generated by the model 120. FIG. 9 depicts a system 900 in an example implementation showing operation of the model 120 as implementing the visually guided language embedding space to generate a second search result in real time based on embeddings generated by the model 120 as a combination of the search query, the search adjustment input, and a relational operator without use of a second order ranking FIG. 10 depicts an example 1000 showing first and second stages 1002, 1004 of a user interface that include the search result and a control operable to input the search adjustment query, respectively. FIG. 11 depicts an example 1100 of a second search result generated based on the embedding generated as a combination of the search query, the search adjustment input, and the relational operator of FIG. 10. FIG. 12 depicts a procedure 1200 in an example implementation of generating the first and second search results of FIGS. 10 and 11 based on the embeddings of the systems of FIGS. 8 and 9.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made interchangeably to FIGS. 1 and 8-12.

As described above, conventional search techniques that support a sequence of search inputs typically rely on a second order ranking. This involves a base search query which is then used by a search provider system to further refine and filter search results based on subsequent search queries. Search results of a first search query, for instance, may be re-ranked and displayed as part of second order ranking that is reprocessed based on a second search query. This may be repeated for subsequent inputs as third-order rankings, fourth-order rankings, and so on, which hinders real time output by conventional service provider systems. This also limits the second search result to include those items that are also included in the first search result. Thus, a search query as implemented by search systems in conventional techniques is typically performed, a result of which is then refined over one or more iterations, e.g., as a second order ranking, a third order ranking, and so on, which limits accuracy of the search result and subsequent search results.

Additionally, conventional search techniques do not support an amount of focus (i.e., weighting) to be given to particular items as part of a search query. These conventional techniques also lack flexibility to do this as supporting multiple types of items as part of a search query, e.g., digital images and text. As such, conventional techniques have limited accuracy and result in inefficient use of computational resources caused by repeated searches due to these inaccuracies.

In the following discussion, the model 120 as implementing a visually guided language embedding space 122 as described above is leveraged as part of multi-modal differential search. The search module 114, through use of the model 120 as trained above, supports search of digital images 110 using text and digital images with real-time focus adaptation which overcomes the challenges of conventional techniques. The visually guided language embedding space 122 of the model 120, for instance, supports direct use of text and digital image embeddings and combinations of these embeddings as described above. Therefore, this supports multiple modes of input through use of the embedding space implemented by the model 120 to generate and further refine searches in real time.

To begin as illustrated at the first stage 802 of FIG. 8 in this example, a search query 806 is received to initiate a search of a plurality of digital images 110 (block 1202). The search query 806, for instance, may be generated based on user interaction with a user interface 118 of a communication module 108 of the client device 104, which is then communicated via the network 106 to the service provider system 102. In another example, the search query 806 is received through local interaction, i.e., the search is performed locally at the client device 104.

At a first stage 1002 of FIG. 10, the search query 806 includes text 1006 "beach accessories" as illustrated in the user interface 118 of the client device 104. In another instance, the search query 806 includes one or more digital images 1008. Other instances are also contemplated in which the search query 806 includes both text 1006 and a digital image 1008.

As shown at a second stage 804 of FIG. 8, a first search result 814 is generated as part of a first search performed by a search module 114 of the service provider system 102 responsive to the search query 806. The first search is performed by the search module 114 based on a search query embedding 810 generated from the search query in an embedding space (block 1204) using the model 120.

Continuing with the previous examples, the model 120 may be used by the search module 114 to generate a search query embedding 810 based on text or digital image embeddings 306, 308 generated, as appropriate, for the text 1006 and digital image 1008 of the search query 806. Thus, the search query embedding 810, may be based on a combination of text and/or digital image embeddings formed from the search query 806 using the model 120 as further described below.

The search query embedding 810 is then compared by the search module 114 with embeddings 812 generated for the digital images 110 or text to perform the search. A nearest neighbor search, for instance, is performed (e.g., based on a least square distance) between the embeddings to determine which embeddings 812 and respective digital images, from which, the embeddings 812 are formed, are the closest to search query embedding 810. This comparison may then be used by the search module 114 to form a ranked list of the digital images 110 (e.g., based on "closeness" to the search query embedding), which are used to generate the first search result 814. An example of display of first search result 814 in a user interface 118 (block 1206) is illustrated as including digital images 1010, 1012 in the first stage 1002 of FIG. 10.

The search module 114 also includes functionality to refine the search without use of second order rankings that supports real time output and increased computational efficiency in generating a search result. As shown at a second stage 1004 of FIG. 10, for instance, a control 1014 is output in the user interface 118 that is configured to adjust the first search, i.e., a search query 806 used to perform the first search. The digital images 1010, 1012 of the first search result 814, for instance, may be based on text 1006 "beach accessories" and a digital image 1008 that includes a beach scene, a chair, and a bucket.

The control 1014 includes functionality, via which, a search adjustment input 906 is then received (block 1208). The search adjustment input 906 may be configured in a variety of ways. In one example, the search adjustment input 906 specifies text or a digital image 908 and an identifier of a relational operator 910 defining a relationship between the text or the digital image 908 with the search query 806 (block 1210).

In the illustrated example of the second stage 1004 of FIG. 10, the search adjustment input 906 specifies the relational operator 910 as an arithmetic operator "Add" along with text "chair" that is to be added to the search query. Thus, in the illustrated example the relational operator 910 "add" specifies a relationship of the text "chair" to the search query 806, e.g., text and/or digital images 808 included in the search query 806. A digital image may also be specified as part of the search adjustment input 906. The control 1014 also includes functionality to specify a relational operator that may also be used to subtract (i.e., "Remove") text or a digital image from the search query. The control 1014 may thus be configured to specify text or a digital image along with the relational operator 910 as an arithmetic operator, e.g., to add or remove concepts expressed by the text or digital image as part of a search adjustment input 906. Other examples of relational operators are also contemplated, e.g., arithmetic operators such as division, multiplication, greater than or less than, and so on.

A second search result 914 is generated as part of a second search performed by the search module 114 using the model 120 responsive to the search adjustment input 914 (block 1214). Continuing with the above example, the second search is performed in real time by the search module 114 using the embedding space based on a combination 916 of a search adjustment embedding 918 generated from the search adjustment input 906 with the search query embedding 918 based on the relational operator 910 (block 1216).

The search query embedding 810, for instance, may be formed as a vector using the text encoder 302 and/or the digital image encoder 304 that is usable directly in a visually guided language embedding space 122 of the model 120. Based on the relational operator 910, a search adjustment embedding 918 generated as a vector using the text encoder 302 and/or the digital image encoder 304 is used in combination 916 (e.g., using vector algebra) with the search query embedding 810 to perform a search, e.g., a nearest neighbor search based on embeddings 812 as previously described. In this way, the search query embedding 810 and search adjustment embedding 918 support multi-modal differential search in real time (block 1220) for output in a user interface 118 by supporting direct use of text and digital image embeddings within the visually guided language embedding space 122 implemented by the model 120.

In another example shown in the first stage 902 of FIG. 9, the search adjustment input 906 specifies a weight 912 to adjust an amount of emphasis of at least one item with respect to the search query (block 1212). As illustrated at the second stage 1004 of FIG. 10, the control 1014 includes functionality to receive an input that specifies an item with respect to the search query 806 as the search adjustment input 906. This may include identifying an item included in the search query 806 or an item (text and/or a digital image) specified in the search adjustment input 906. In the illustrated example, the item is text specifying a "chair" that is to be added to the search query 806 as part of the search adjustment input 906, along with a weight that specifies an amount of emphasis to be applied to this item as part of the search.

A second search result 914 is generated by the search module 114 as part of a second search performed responsive to the search adjustment input 906 (block 1214). In this example, the second search is performed in real time using the search query having the weight applied to the at least one item (block 1218), which is then output in real time in a user interface 118 (block 1220). Continuing with the vector example above, the weight 912 is used to specify an amount of emphasis to be applied to the vector of the search adjustment embedding 908 in combination 906 with a vector of items of the search query embedding 810 based on the relational operator 910 as part of vector algebra. The embedding formed from the resulting combination 916 may then be used to perform a search directly in real time the embedding space, e.g., as part of a nearest neighbor search based on the embeddings 812 as described above.

Thus, as shown at a first stage 1002 of FIG. 10, a first search result is displayed based on a search query, which may include text and/or a digital image through use of an embedding generated by the model 120 to implement a visually guided language embedding space 122. A search adjustment input 906 is received at the second stage 1004 through use of a control 1014 which supports use of relational operators (e.g., arithmetic operators) as part of a vector algebra to perform a search based on embeddings generated for the search query and the search adjustment input. This may also be used to specify weights to individual items in the search query and/or search adjustment input to specify amounts of emphasis to these items, e.g., positive weights are specified to add concepts to the search query whereas negative weights are specified to remove concepts from the search query. In the illustrated example, an item "chair" is to be added along with a specified weight of 140% through use of a slider control. This causes digital images 1102, 1104, 1106, 1108 to be output in a search result as shown in an example 1100 of FIG. 11 having an increased emphasis on "chair."

In this way, direct use of text and digital image embeddings, and combinations thereof, as part of a visually guided language embedding space 122 supports functionality that is simply not possible for conventional techniques. So, for example, an <image embedding1>, a <text embedding1>, a <text embedding2>, and an <image embedding2>can be combined to form a search query as a resulting mixed modal embedding:

<image embedding1>+$w1$*<text embedding1>−
$w2$*<text embedding2>+$w3$*<image embedding2> where w1, w2 and w3 are weights.

This resulting mixed embedding can be used as part of a nearest neighbor search by the search module 114 to locate similar digital images 110 based on least square distance between the new mixed embedding and the embeddings of digital images 110 in the storage device 112. These results effectively satisfy the constraints specified in the implicit equation of the resulting mixed embedding above to locate a digital image 110 similar to image1, having some of the content of text1, not having some of the content of text2, and having some of the features of image2. The weights "w1," "w2," "w3" specify the emphasis of each respective constraint, and thus may be employed to each of the constraints or some of the constraints. In this way, multimodal search is implemented by the search module 114 through use of the visually guided language embedding space 122 that may be performed in real time without use of second order rankings and further may support weights to different items (e.g., text and/or digital images) in the search query. The visually guided language embedding space 122 may be generated as a single unified text-and-digital image embedding space through training of the model 120, further discussion of which is included in the following sections.

Training Dataset Generation

Figure 13:
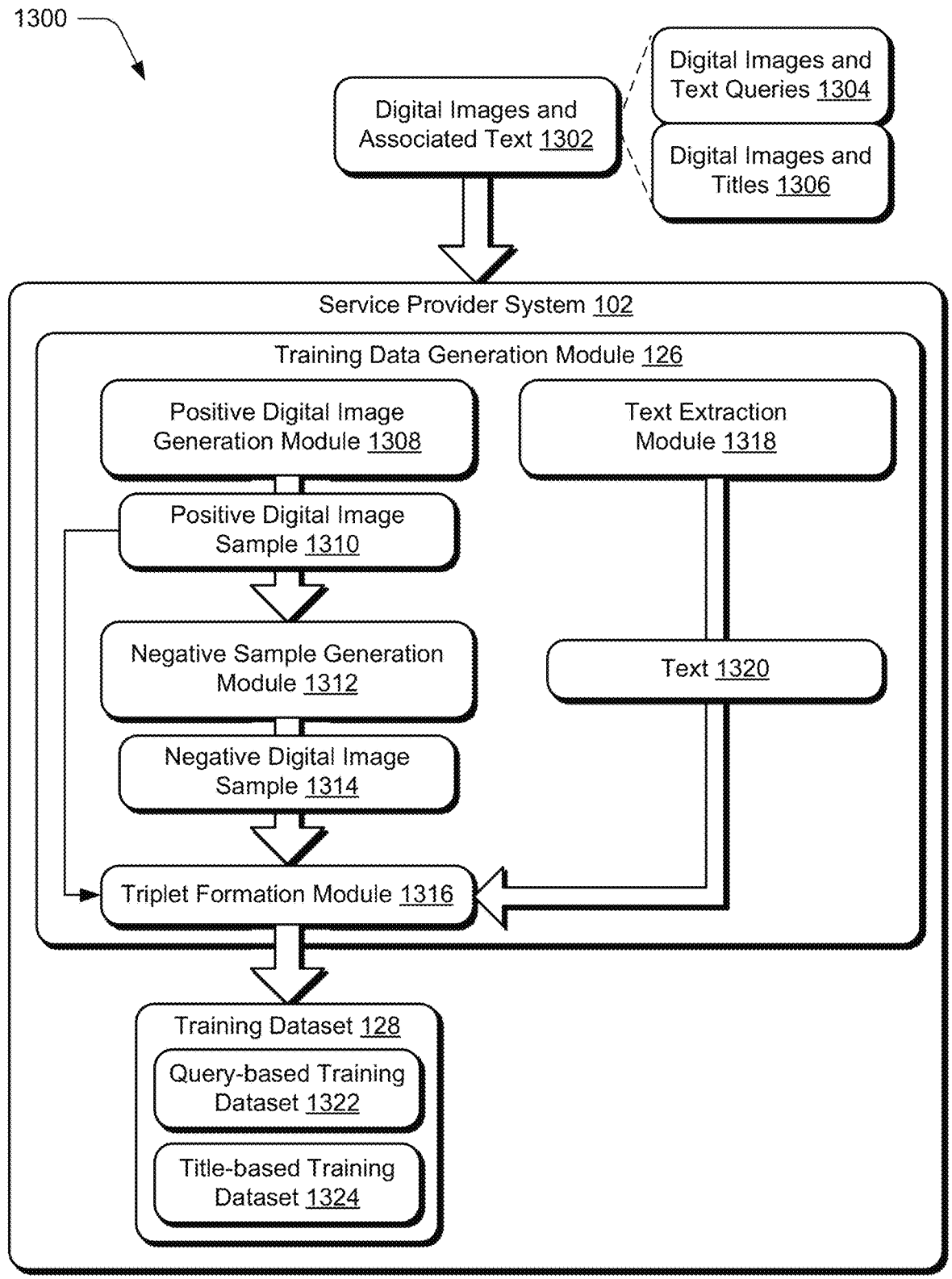
FIG. 13 depicts a system in an example implementation in which a training dataset is generated that includes negative digital images samples selected based on positive digital images samples and associated text.
Figure 14:
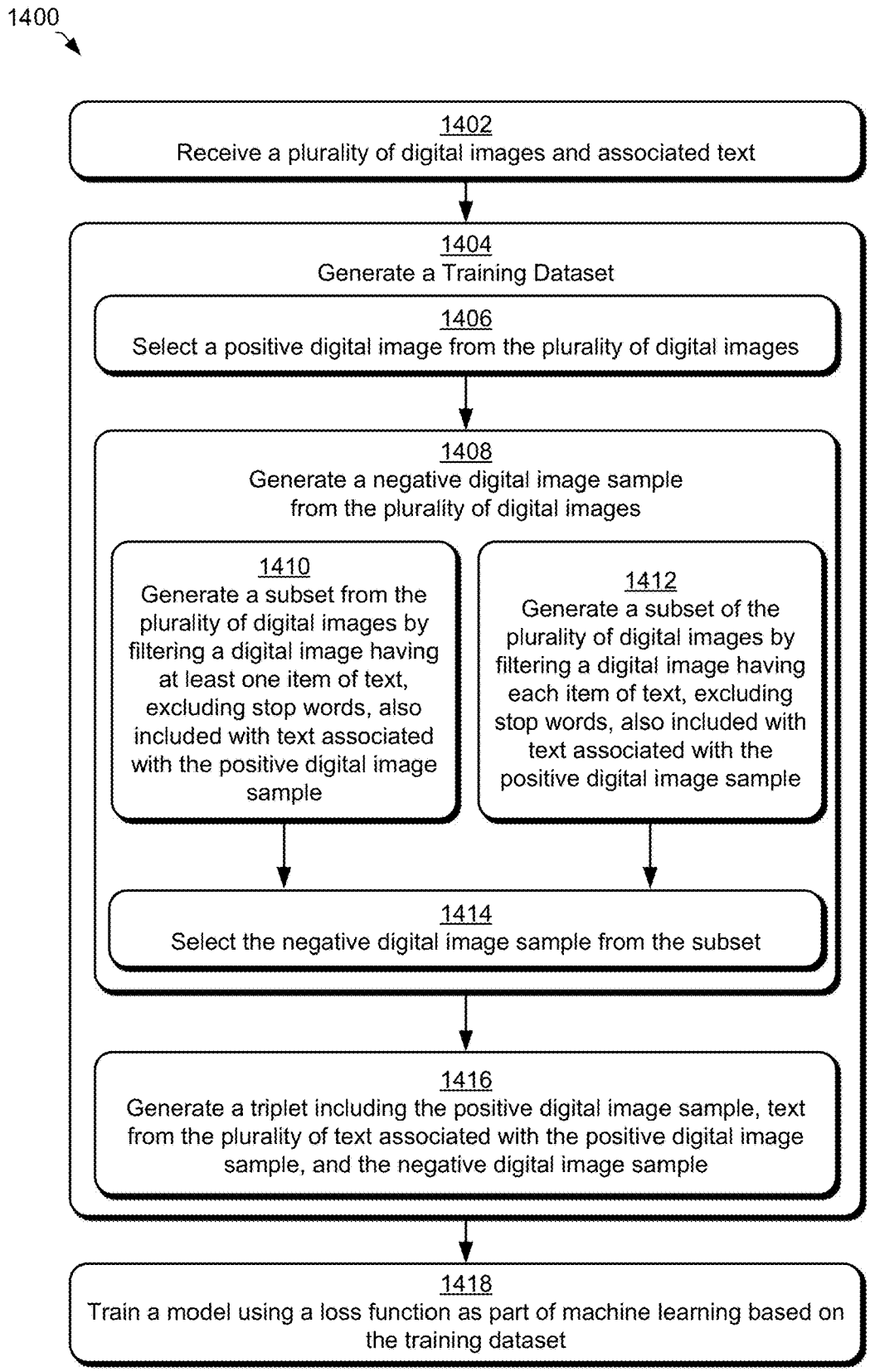
FIG. 14 depicts a procedure in an example implementation in which negative digital image samples are generated based on a comparison of text associated the negative digital image samples and text associated with the positive digital image samples.

FIG. 13 depicts a system 1300 in an example implementation in which a training dataset is generated that includes negative digital images samples selected based on positive digital images samples and associated text. FIG. 14 depicts a procedure 1400 in an example implementation in which negative digital image samples are generated based on a comparison of text associated the negative digital image samples and text associated with the positive digital image samples.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made interchangeably to FIGS. 1 and 13-14.

When training the model 120 by the machine-learning training module 130, positive and negative digital image samples are used as part of a triplet loss to adjust weights of neurons in a neural network of the model 120. This is performed to ensure that for an embedding space implemented by the model 120, examples (i.e., digital images) having the same or similar text are clustered close together in the embedding space (i.e., the single visually guided language embedding space 122) and examples having dissimilar text are not close together in the embedding space and causes formation of tighter clusters.

In this section, techniques are described to generate negative digital image samples that increase accuracy and computational efficiency in training the model 120 by the machine-learning training module 130. This is achieved by the training data generation module 126, automatically and without user intervention, by generating negative digital image samples that have a semantic and/or visual meaning similar to that of the positive digital image sample, but not exactly, and thus improves an ability of the model 120 to distinguish between these samples.

To begin, the training data generation module 126 receives a plurality of digital images and associated text 1302 (block 1402). This plurality may include digital images and text queries 1304, digital images and titles 1306, as well as other examples of digital image and text associations that may be used to generate the training dataset 128.

A training dataset 128 is then generated (block 1404) by the training data generation module 126 automatically and without user intervention based on the digital images and associated text 402. First, a positive digital image sample 1310 is selected by a positive digital image generation module 408 from the plurality of digital images (block 1406). This may be performed by selecting any digital image from the digital images and associated text 1402, through use of a queue, and so forth.

A negative digital image sample 1314 is then generated by a negative sample generation module 1312 from the digital images and associated text 1302 based on the positive digital image sample 1310. This may be performed in a variety of ways by the negative sample generation module 1312, examples of which in the following include filtering the plurality of digital images 1302.

In one example of filtering, a subset of the plurality of digital images is generated by the negative sample generation module 1312. This is performed by filtering (e.g., removing) digital images from the plurality of digital images 1302 having at least one item of text, excluding stop words, also included with text associated with the positive digital image sample (block 1410). For example, if text associated with the positive digital image sample is "man on a motorbike," removing stop words of "on" and "a" results in items of text of "man" and "motorbike," i.e., "pivots." Therefore, each digital image of the digital images 1302 that is associated with text that includes either "man" or "motorbike" is removed from the plurality of digital images, thereby forming the subset from the digital images of the plurality of digital images 1302 that remain.

The negative digital image sample 1314 is then selected by the negative sample generation module 1312 from the subset (block 514). The negative sample generation module 1312, for instance, may select "N" negative samples based on a least squared distance from the positive digital image sample 1310 using respective image embeddings generated using a convolutional neural network. This is an example of "hard" negative image selection, which in an implementation is used for generating a query-based training dataset 1322 from digital images and text queries 1304, which may be used as part of multi-task training as further described below.

In another example, a subset of the plurality of digital images is generated by the negative sample generation module 1312 by filtering digital images from the plurality of digital images and associated test 1302 having each item of text, excluding stop words, that is also included with text associated with the positive digital image sample 1310 (block 1412). The digital image that are not filtered form the subset and the negative digital image sample 1314 is again selected from the subset (block 1414).

Continuing with the previous example, if text associated with the positive digital image sample 1310 is "man on a motorbike," removal of stop words of "on" and "a" results in items of text of "man" and "motorbike," i.e., the "pivots." The subset is then generated from the digital images and associated text 1302 that are not associated with text including both "man" and "motorbike." This is considered as generating an even "harder" negative sample and in an implementation is used for the digital images and titles 1306 to generate a title-based training dataset 1324 as part of multi-task training. This may be used, for instance, to address technical challenges in that an amount of text typically observed for titles that is greater than an amount of text typically observed for text queries and as a result this generates negative digital image samples 1314 for titles that have increased robustness.

The negative digital image sample 1314 is again selected by the negative sample generation module 1312 from the subset (block 1414) in this example. The negative sample generation module 1312, for instance, may select "N" negative samples based on a least squared distance from the positive digital image sample 1310 using respective image embeddings generated using a convolutional neural network (CNN).

A triplet is generated by a triplet formation module 1316 as including the positive digital image sample 1310, text 1320 from the plurality of text associated with the positive digital image sample 1310, and the negative digital image sample 1314 (block 1416). A text extraction module 1318, for instance, may extract text 1320 from the digital images and associated text 1302 that corresponds to the positive digital image sample 1310. In this way, the training data generation module 126 generates a training dataset 128 from the digital images and associated text 402, which may include a query-based training dataset 1322 and a title-based training dataset 1324 which are usable to train a model 120 using a loss function 132 as part of machine learning (block 1418) as further described in the following section.

Loss Function

Figure 15:
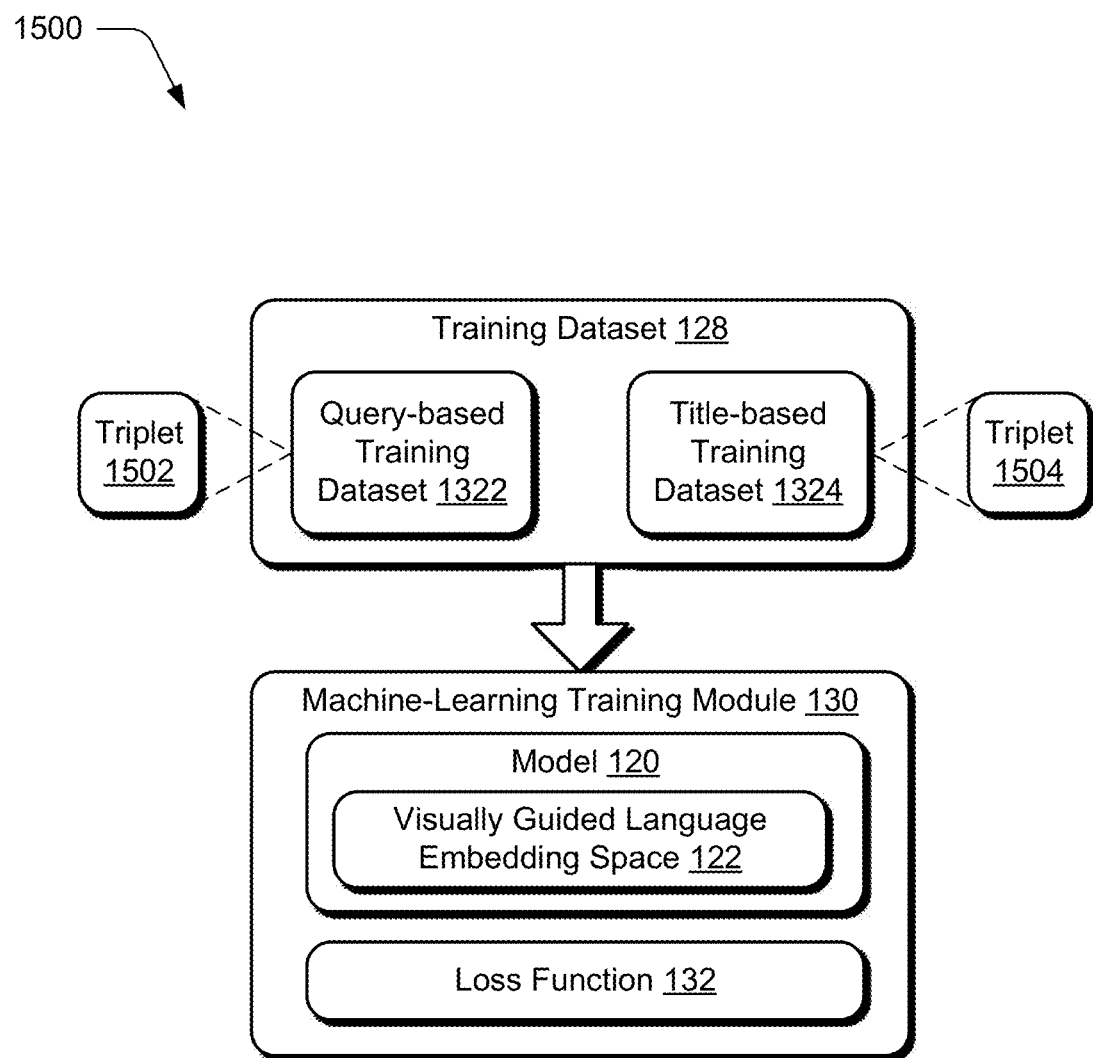
FIG. 15 depicts a system in an example implementation showing multi-task training of a model by a machine-learning training module based on a query-based training dataset and a title-based training dataset.
Figure 16:
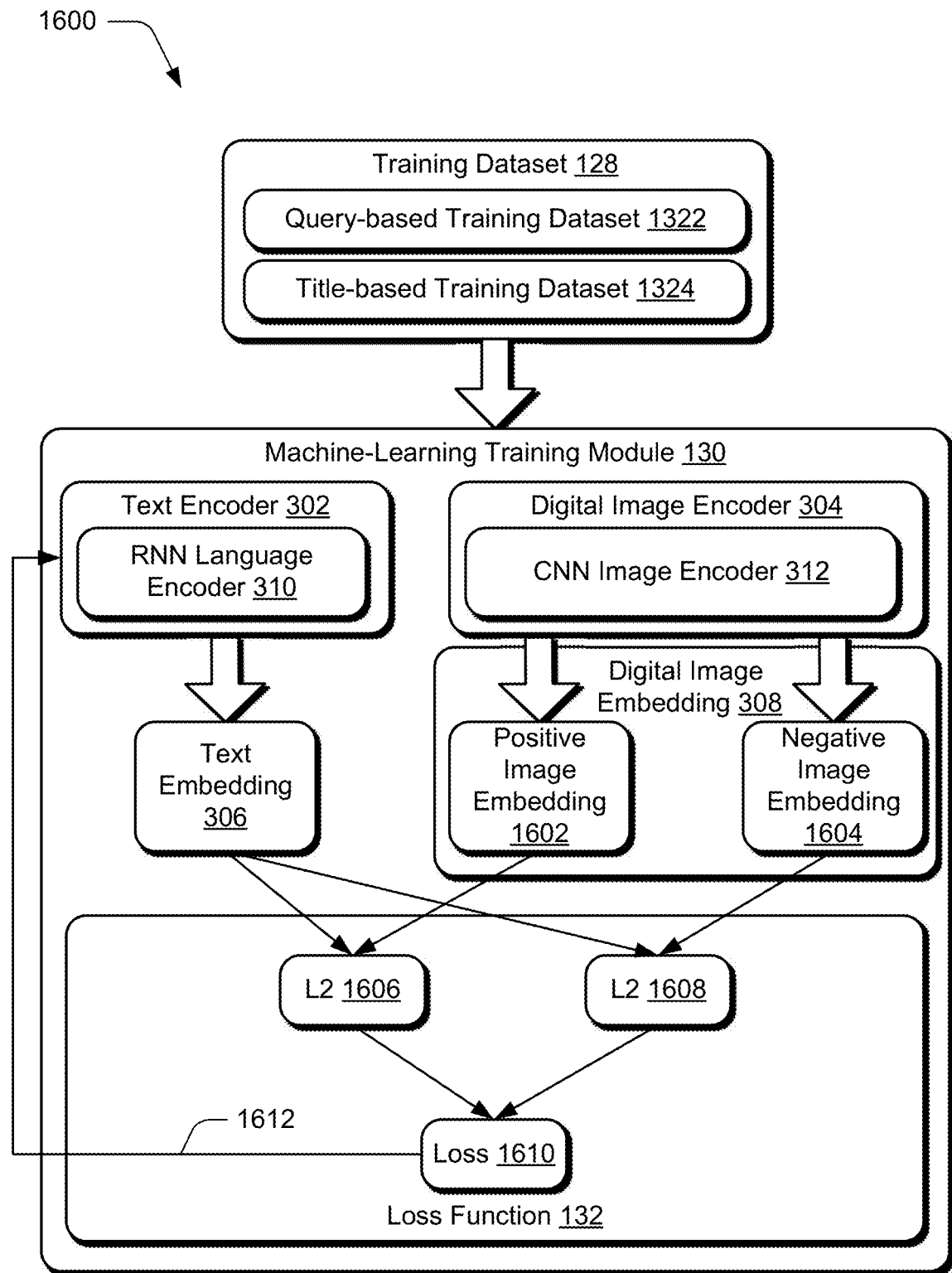
FIG. 16 depicts a system showing operation of the machine-learning training module in greater detail as generating embeddings and using the loss function.
Figure 17:
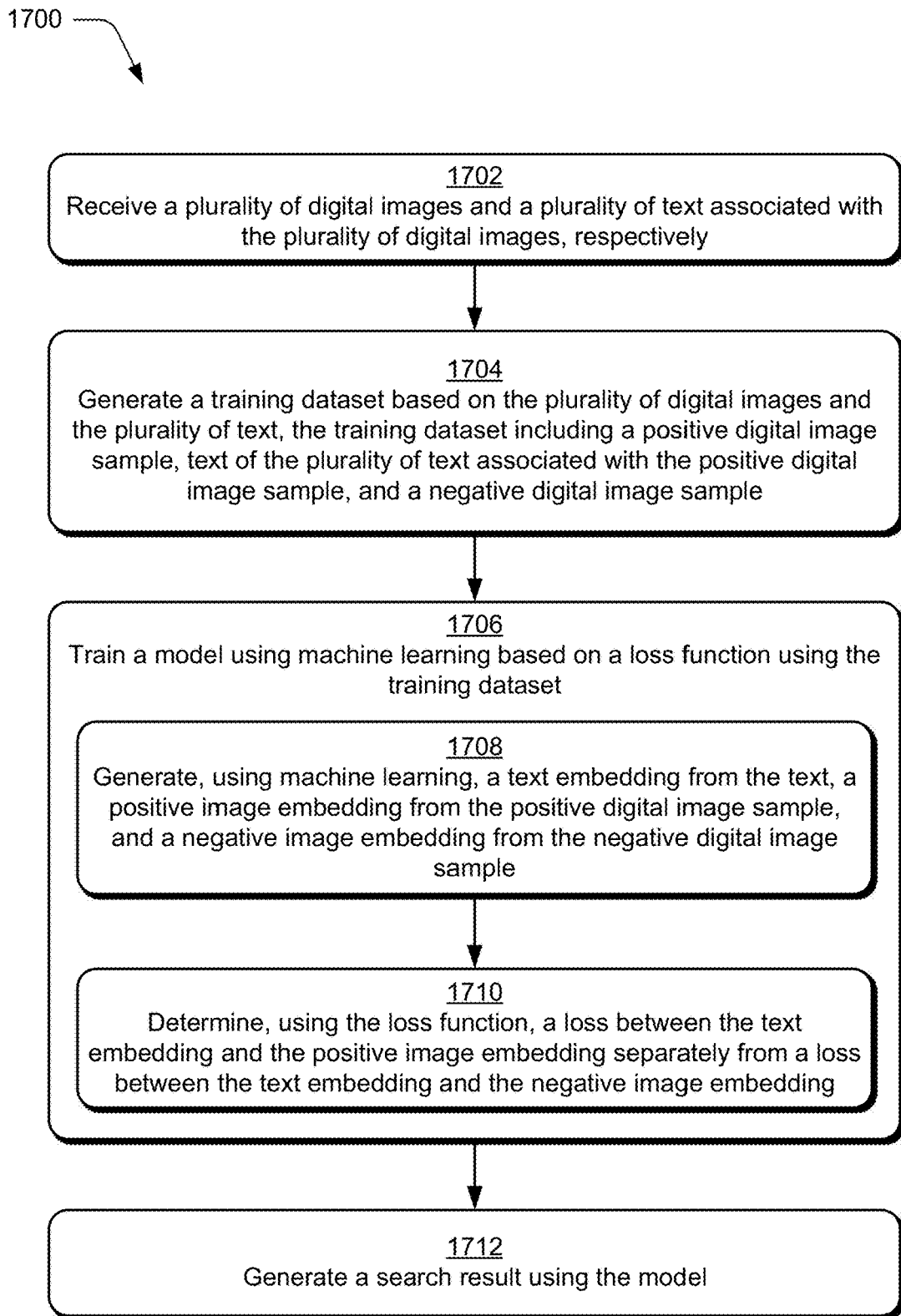
FIG. 17 depicts a procedure in an example implementation in which a model is trained based on a loss function that addresses a loss between a text embedding and a positive image embedding separately from a loss between the text embedding and a negative image embedding.

FIG. 15 depicts a system 1500 in an example implementation showing multi-task training of a model 120 by a machine-learning training module 130 using multi-task training based on a query-based training dataset 1322 and a title-based training dataset 1324. FIG. 16 depicts a system 1600 showing operation of the machine-learning training module 130 in greater detail as generating embeddings and using the loss function 132. FIG. 17 depicts a procedure 1700 in an example implementation in which a model is trained based on a loss function that addresses a loss between a text embedding and a positive image embedding separately from a loss between the text embedding and a negative image embedding.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made interchangeably to FIGS. 1 and 15-17.

A multi-task training approach may be taken in training the model 120 by the machine-learning training module 130 in order to increase accuracy of the model 120. This is performed in FIG. 15 through use of a training dataset 128 that includes a query-based training dataset 1322 and a title-based training dataset 1324. Each of these datasets include respective triplets 1502, 1504 of positive digital image samples, text associated with respective positive digital image samples, and negative digital image samples as described in the previous section. In this way, the machine-learning training module 130 is configured to capture user intention from the query-based training dataset 1322 regarding association of text queries with respective digital images and also create embeddings for long sequences of text (e.g., sentences) using the title-based training dataset 1324. The model 120, once trained, is therefore able to address text and text sequences with increased efficiency and accuracy, e.g., to address differences in "girl cat" and "girl holding a cat."

As part of this, the machine-learning training module 130 generates a single visually guided language embedding space 122 as previously described, to which, the digital images and associated text are projected, together. The machine-learning training module 130, for instance, may leverage pre-trained architectures that are trained on a large corpus of digital images to predict tags, examples of which include VGG-19, ResNet-152, ResNet-50, and so on. A layer positioned before a last activation layer in these architectures (i.e., a SoftMax layer), for instance, may be leveraged by the machine-learning training module 130 as the common embedding space. To do so, a modified version of a triplet loss is used as a loss function 132 to train the model 120.

FIG. 16 depicts a system 1600 showing operation of the machine-learning training module 130 in greater detail as generating embeddings and using the loss function 132 to train a model 120. Continuing with the previous example, the machine-learning training module 130 is configured to perform multi-tasking training in which samples are taken from the query-based training dataset 1322 and title-based training dataset 1324, separately. The samples, for instance, may form a triplet that includes a positive digital image sample, text associated with the positive digital images sample, and a negative digital image sample generated based on the positive digital image sample.

Thus, service provider system 102 may, as described above, receive a plurality of digital images and a plurality of text associated with the plurality of digital images, respectively (block 1702), e.g., text queries, titles, and so on. A training data generation module 126 is then utilized to generate a training dataset 128 based on the plurality of digital images and the plurality of text. The training dataset 128 includes a positive digital image sample, text of the plurality of text associated with the positive digital image sample, and a negative digital image sample (block 1704). The training dataset 128 is then output by the training data generation module 126 and received as an input by the machine-learning training module 130.

The machine-learning training module 130 trains the model 120 using machine learning based on a loss function 132 (block 1706). The machine-learning training module 130 begins the training of the model 120 by forming embeddings (e.g., vectors) for the text and digital images through use of a text encoder 302 and a digital image encoder 304 to generate a text embedding 306 and digital image embeddings 308 as previously described. In this example, the digital image encoder 304 generates a positive image embedding 1602 from the positive digital image sample and a negative image embedding 1604 from the negative digital image sample (block 1708).

The text encoder 302 in the illustrated example generates the text embedding 306 (e.g., a vector having a length of 2048) based on the text using a recurrent neural network (RNN) language encoder 310. The RNN is type of neural network in which connections between nodes for a directed graph along a temporal sequence and may use an internal state to process sequences of inputs. In this way, the text embedding 306 may capture an order of text, e.g., within a text query or text input, which is not possible in tag-based approaches.

Once the text embedding 306 and the positive and negative image embeddings 1602, 1604 are generated, a loss function 132 is utilized to train the model 120. The loss function 132 of the machine-learning training module 130 is configured to determine a loss between the text embedding 306 and the positive image embedding 1602 separately from a loss between the text embedding 306 and the negative image embedding 1604 (block 1710).

The loss function 132 as illustrated in FIG. 16, for instance, includes an L2 1606 loss (e.g., squared distance) that is used to determine a loss between the text embedding 306 and the positive image embedding 1602 separately from an L2 1608 (e.g., squared distance) loss determined between the text embedding 306 and the negative image embedding 1604. This is referred to as a "Positive Aware Triplet Ranking Loss" in the current discussion, which may be expressed as follows:

$$\text{Positive aware triplet ranking loss} = s_p + \max(0, \text{margin} - s_n)$$

in which a square distance between the positive image embedding 1602 and the text embedding 306 is "$s_p$" and a square distance between the negative image embedding 1604 and the text embedding 306 is "$s_n$".

Conventional triplet loss functions are configured to minimize "$s_p - s_n$" by increasing a value of both "$s_p$" and "$s_n$". Therefore, in the conventional triplet loss function as both values increase, the difference automatically increases. However, in the positive aware triplet ranking loss illustrated as the loss function 132 described herein, the losses are addressed separately. Therefore, the positive aware triplet ranking loss is configured to minimize "$s_p$" (i.e., a loss between the text embedding 306 and the positive image embedding 1602) separately from maximizing "$s_n$" (i.e., a loss between the text embedding 306 and the negative image embedding 1604). This causes the positive image embeddings 1604 to increase similarity to the text embedding 306, e.g., to lie in a same cluster, and at the same time tighten these cluster by maximizing "$s_n$", i.e., to increase dissimilarity to the negative image embedding 1604.

In instances in which multiple negative samples are employed, the machine-learning training module 130 selects a top "N" samples with a least square distance that are not rejected, instead of a top sample. The loss function 132 may then be expressed as:

$$\text{Positive aware triplet ranking loss} = s_p + \Sigma i \, (\max(0, \text{margin} - S_{ni})).$$

In an implementation, a number of samples is increased by a defined number at a defined point in time, e.g., every ten epochs.

Thus, during training a distance between the positive image embedding 1602 and the text embedding 306 reduces over time while a distance between the negative image embedding 1604 and the text embedding 306 increases. In instances of multi-task training, the postive aware triplet loss function may implement different margins for losses employed for query-based training dataset 1322 and the title-based training dataset 1324. The L2 losses 1606, 1608 are then averaged as loss 1610 in FIG. 7 and back propagated 1612 through the network, e.g., to train the text encoder 302. The model 120, once trained, may be used to support a variety of functionality, such as to generate a search result (block 1712), digital image retrieval, machine transition, text retrieval, speech recognition, text summarization, and so forth.

Thus, as described above the machine learning embedding techniques are configured to overcome the challenges of conventional techniques in a variety of ways. These techniques include use of query-based training data which may expand availability and types of training data usable to train a model. The use of query-based training data may also be expanded through use of title-based training data as part of multi-task learning, which improves training accuracy by limiting noise in the query-based training data and supports use of long text sequences.

Generation of negative digital image samples is also described that may increase accuracy in training the model using machine learning by having a semantic and/or visual meaning that is similar to a positive digital image sample, but does not have the exact same components of the positive digital image sample. This training data may then be used to generate a model supporting a single visually guided language embedding space that is configured to treat text and digital images as the same entity, and thus overcomes the limitations of conventional techniques that are solely text based.

A loss function is also described that also supports increased accuracy and computational efficiency by treating a less calculated between a positive image embedding generated from a positive digital image sample and a text embedding calculated based on text associated with the positive digital image sample separately from a negative image embedding generated from a negative digital image sample and the text embedding. This permits a distance between the positive image embedding and the text embedding to reduce over time while a distance between the negative image embedding and the text embedding increases, thereby increasing model accuracy.

Example System and Device

Figure 18:
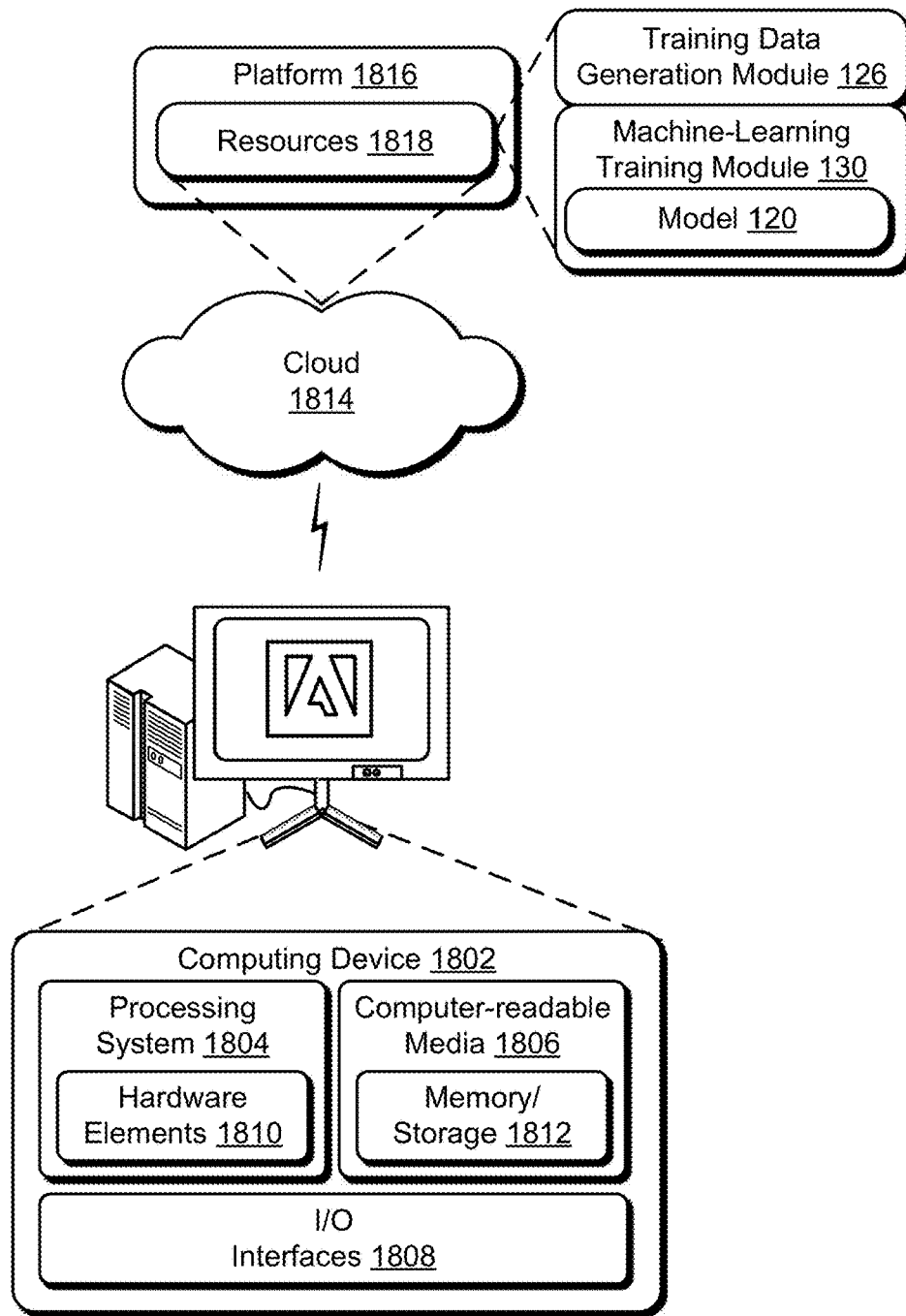
FIG. 18 illustrates an example system including various components of an example device that can be implemented as any type of computing device as described and/or utilize with reference to FIGS. 1-17 to implement embodiments of the techniques described herein.

FIG. 18 illustrates an example system generally at 1800 that includes an example computing device 1802 that is representative of one or more computing systems and/or devices that may implement the various techniques described herein. This is illustrated through inclusion of the training data generation module 126, and machine-learning training module 130, and the model 120. The computing device 1802 may be, for example, a server of a service provider, a device associated with a client (e.g., a client device), an on-chip system, and/or any other suitable computing device or computing system. Further, the computing device 1802 may implement the platform 1816 and resources.

The example computing device 1802 as illustrated includes a processing system 1804, one or more computer-readable media 1806, and one or more I/O interface 1808 that are communicatively coupled, one to another. Although not shown, the computing device 1802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1804 is representative of functionality to perform one or more operations using hardware. Accordingly, the processing system 1804 is illustrated as including hardware element 1810 that may be configured as processors, functional blocks, and so forth. This may include implementation in hardware as an application specific integrated circuit or other logic device formed using one or more semiconductors. The hardware elements 1810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1806 is illustrated as including memory/storage 1812. The memory/storage 1812 represents memory/storage capacity associated with one or more computer-readable media. The memory/storage component 1812 may include volatile media (such as random access memory (RAM)) and/or nonvolatile media (such as read only memory (ROM), Flash memory, optical disks, magnetic disks, and so forth). The memory/storage component 1812 may include fixed media (e.g., RAM, ROM, a fixed hard drive, and so on) as well as removable media (e.g., Flash memory, a removable hard drive, an optical disc, and so forth). The computer-readable media 1806 may be configured in a variety of other ways as further described below.

Input/output interface(s) 1808 are representative of functionality to allow a user to enter commands and information to computing device 1802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1810 and computer-readable media 1806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1810. The computing device 1802 may be configured to implement particular instructions and/or functions corresponding to the software and/or hardware modules. Accordingly, implementation of a module that is executable by the computing device 1802 as software may be achieved at least partially in hardware, e.g., through use of computer-readable storage media and/or hardware elements 1810 of the processing system 1804. The instructions and/or functions may be executable/operable by one or more articles of manufacture (for example, one or more computing devices 1802 and/or processing systems 1804) to implement techniques, modules, and examples described herein.

The techniques described herein may be supported by various configurations of the computing device 1802 and are not limited to the specific examples of the techniques described herein. This functionality may also be implemented all or in part through use of a distributed system, such as over a "cloud" 1814 via a platform 1816 as described below.

The cloud 1814 includes and/or is representative of a platform 1816 for resources 1818. The platform 1816 abstracts underlying functionality of hardware (e.g., servers) and software resources of the cloud 1814. The resources 1818 may include applications and/or data that can be utilized while computer processing is executed on servers that are remote from the computing device 1802. Resources 1818 can also include services provided over the Internet and/or through a subscriber network, such as a cellular or Wi-Fi network.

The platform 1816 may abstract resources and functions to connect the computing device 1802 with other computing devices. The platform 1816 may also serve to abstract scaling of resources to provide a corresponding level of scale to encountered demand for the resources 1818 that are implemented via the platform 1816. Accordingly, in an interconnected device embodiment, implementation of functionality described herein may be distributed throughout the system 1800. For example, the functionality may be implemented in part on the computing device 1802 as well as via the platform 1816 that abstracts the functionality of the cloud 1814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium of a machine learning environment, a system comprising:
    a search module implemented by a processing system and a computer readable storage medium, the search module including a model trained using machine learning, the search module implemented to:
        receive a search query including text and a digital image;
        generate a text embedding from the text of the search query via a text encoder, the text embedding usable directly as part of a single visually guided machine learning embedding space;
        generate a digital image embedding from the digital image of the search query, the digital image embedding usable directly as part of the single visually guided machine learning embedding space;
        automatically determine a first weight to apply to the text embedding and a second weight to apply to the digital image embedding based on each modal type of constraint of the text of the search query and the digital image of the search query;
        generate a search query embedding by combining the text embedding and the first weight with the digital image embedding and the second weight;
        compare the search query embedding directly with embeddings of digital images or text within the single visually guided machine learning embedding space;
        output, based on the comparing of the search query embedding directly with embeddings of digital images or text within the single visually guided machine learning embedding space, a search result of the search query for display in a user interface.

2. The system as described in claim 1, wherein the text embedding and the digital image embedding are usable directly as part of the single visually guided machine learning embedding space such that the text embedding is comparable with the digital image embedding, without modification, to determine similarity of the text used to generate the text embedding with the digital image used to generate the digital image embedding.

3. The system as described in claim 1, wherein the search module is implemented to generate the digital image embedding via a digital image-digital image encoder including a convolutional neural network (CNN) image encoder.

4. The system as described in claim 1, wherein the text encoder includes a recurrent neural network (RNN) language encoder.

5. The system as described in claim 4, wherein the text encoder includes:
    a pre-trained word embedding module to convert the text of the search query into a pre-trained word embedding;
    stacked long short-term memory (LSTM) cells to capture sequential information from the pre-trained word embedding; and
    at least one fully connected layer to generate the text embedding from the pre-trained word embedding and the sequential information captured.

6. The system as described in claim 5, wherein the at least one fully connected layer is configured to cause the text embedding to have a first vector length that matches a second vector length of the digital image embedding.

7. The system as described in claim 1, wherein the single visually guided machine learning embedding space is based on an image embedding space.

8. The system as described in claim 1 further comprising a machine learning training module implemented by the processing system and the computer readable storage medium to, train the model by using a loss function configured to generate a loss between a text embedding and a positive image embedding separately from a loss between the text embedding and a negative image embedding.

9. The system as described in claim 8, wherein the loss function is configured to:
- decrease a distance between the text embedding and the positive image embedding in the visually guided machine learning embedding space during training of the model; and
- increase a distance between the text embedding and the negative image embedding in the visually guided machine learning embedding space during training of the model.

10. The system as described in claim 1, wherein the search module is further configured to generate, based on the search result or the second search result, a machine translation, text summarization, speech recognition, or text retrieval using the model.

11. A method implemented by a computing device in a digital medium of a machine learning environment, the method comprising:
- receiving, by the computing device, a search query including text and a digital image;
- generating, by the computing device, a text embedding from text of the digital image via a text encoder, the text embedding usable directly as part of a single visually guided machine learning embedding space;
- generating, by the computing device, a digital image embedding from the digital image, the digital image embedding usable directly as part of the single visually guided machine learning embedding space;
- automatically determining, by the computing device, a first weight to apply to the text embedding and a second weight to apply to the digital image embedding based on each modal type of constraint of the text of the search query and the digital image of the search query;
- generating, by the computing device, a search query embedding by combining the text embedding and the first weight with the digital image embedding and the second weight;
- comparing, by the computing device, the search query embedding directly with embeddings of digital images or text within the single visually guided machine learning embedding space;
- outputting, by the computing device, based on the comparing of the search query embedding directly with embeddings of digital images or text within the single visually guided machine learning embedding space, a search result of the search query for display in a user interface.

12. The method as described in claim 11, wherein the automatically generating of the digital image embedding is via a convolutional neural network (CNN) image encoder.

13. The method as described in claim 11, wherein the text encoder includes a recurrent neural network (RNN) language encoder.

14. The method as described in claim 13, wherein the text encoder includes:
- a pre-trained word embedding module to convert text of the search query into a pre-trained word embedding;
- stacked long short-term memory (LSTM) cells to capture sequential information from the pre-trained word embedding; and
- at least one fully connected layer to generate the text embedding from the pre-trained word embedding and the captured sequential information.

15. The method as described in claim 14, wherein the at least one fully connected layer is configured to cause the text embedding to have a vector length that matches a vector length of the digital image embedding.

16. The method as described in claim 11, wherein the single visually guided machine learning embedding space is based on an image embedding space.

17. The method as described in claim 11, wherein the search result includes a machine translation, a text summarization, or a text retrieval.

18. In a digital medium machine learning environment, a system comprising:
- means for receiving a search query including text and a digital image;
- means for generating a text embedding from text of the digital image using a text encoder, the text embedding usable directly as part of a single visually guided machine learning embedding space;
- means for generating a digital image embedding from the digital image, the digital image embedding usable directly as part of the single visually guided machine learning embedding space;
- means for automatically specifying a first weight to apply to the text embedding and a second weight to apply to the digital image embedding based on each modal type of constraint of the text of the search query and the digital image of the search query;
- means for generating a search query embedding by combining the text embedding and the first weight with the digital image embedding and the second weight;
- means for comparing the search query embedding directly with embeddings of digital images or text within the single visually guided machine learning embedding space;
- means for outputting, based on the comparing of the search query embedding directly with embeddings of digital images or text within the single visually guided machine learning embedding space, a search result of the search query for display in a user interface.

19. The system as described in claim 18, wherein the generating the digital image embedding means includes using a convolutional neural network (CNN) image encoder.

20. The system as described in claim 18, wherein the means for the generating of the text embedding includes using a recurrent neural network (RNN) language encoder.

\* \* \* \* \*